(12) United States Patent
Horie et al.

(10) Patent No.: US 6,445,438 B1
(45) Date of Patent: Sep. 3, 2002

(54) LIQUID CRYSTAL DISPLAY DEVICE AND METHOD FOR FABRICATING THE SAME

(75) Inventors: Wataru Horie, Hashimoto; Takayoshi Nagayasu, Soraku-gun; Toshio Fujii, Matsusaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/237,008

(22) Filed: Jan. 26, 1999

(30) Foreign Application Priority Data

Jan. 26, 1998 (JP) .......................................... 10-013035

(51) Int. Cl.[7] .......................... G02F 1/13; G02F 1/1333; G02F 1/1335; G02F 1/133
(52) U.S. Cl. .......................... 349/187; 349/86; 349/89; 349/106; 349/32
(58) Field of Search .......................... 349/32, 86, 106, 349/89, 187

(56) References Cited

U.S. PATENT DOCUMENTS 5,731,111 A    3/1998  Yamada et al.
6,014,188 A *  1/2000  Yamada et al. ............... 349/32
6,016,181 A *  1/2000  Shimada ..................... 349/156

FOREIGN PATENT DOCUMENTS

| JP | 4-265931 | 9/1992 |
| JP | 7-120728 A | 5/1995 |
| JP | 8-278504 | 10/1996 |
| JP | 8-292423 A | 11/1996 |
| JP | 9-258017 A | 10/1997 |
| JP | 10-301101 | * 11/1998 |

* cited by examiner

Primary Examiner—William L. Sikes
Assistant Examiner—Tarifu R. Chowdhury
(74) Attorney, Agent, or Firm—Nixon & Vanderhye, P.C.

(57) ABSTRACT

The liquid crystal display device of this invention includes a first substrate, a second substrate opposing the first substrate, and a liquid crystal layer sandwiched between the first and the second substrates, wherein the liquid crystal layer includes a polymer region and a liquid crystal domain surrounded by the polymer region in which liquid crystal molecules are oriented in an axial symmetrical manner, the first substrate includes a dry film having a concave portion on a surface facing the liquid crystal layer, and a symmetric axis in the liquid crystal domain substantially extends through the concave portion and is substantially perpendicular to the first substrate.

1 Claim, 19 Drawing Sheets

Light exposure from back surface

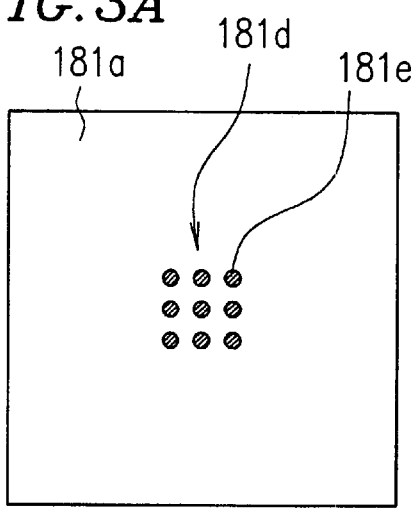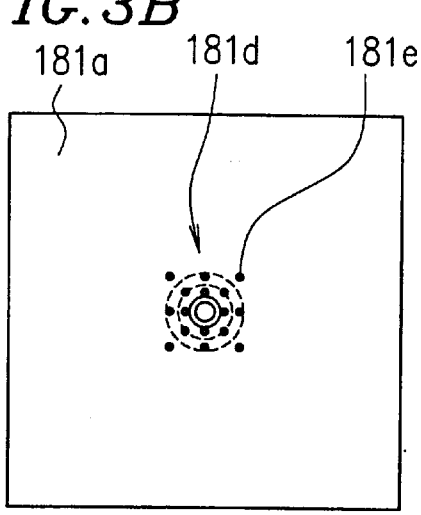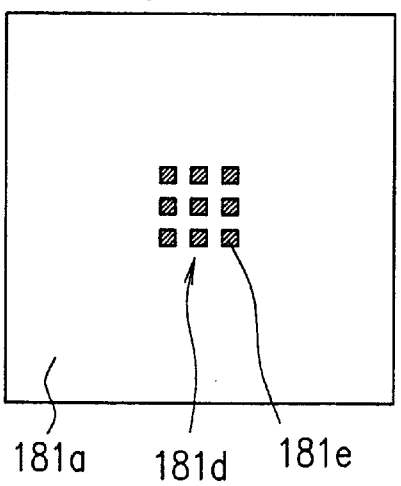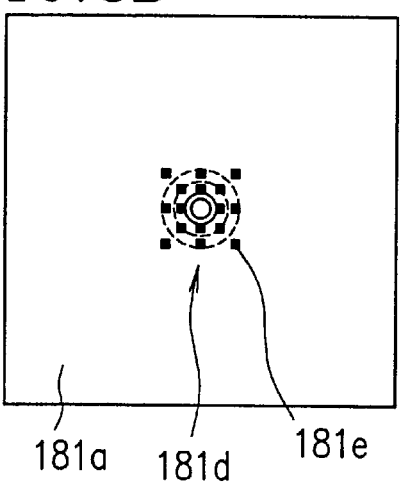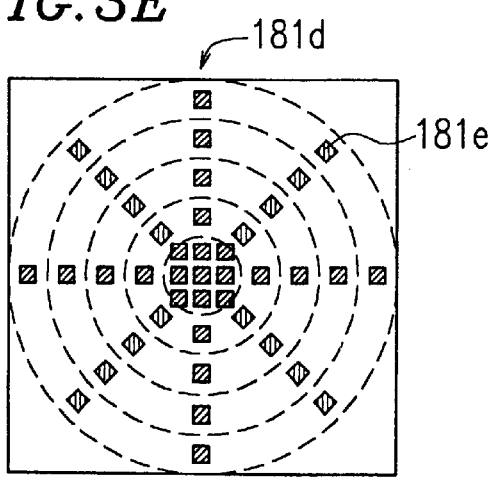

One pixel

Light exposure intensity

One pixel

Light exposure intensity

Light exposure intensity

Light exposure from back surface

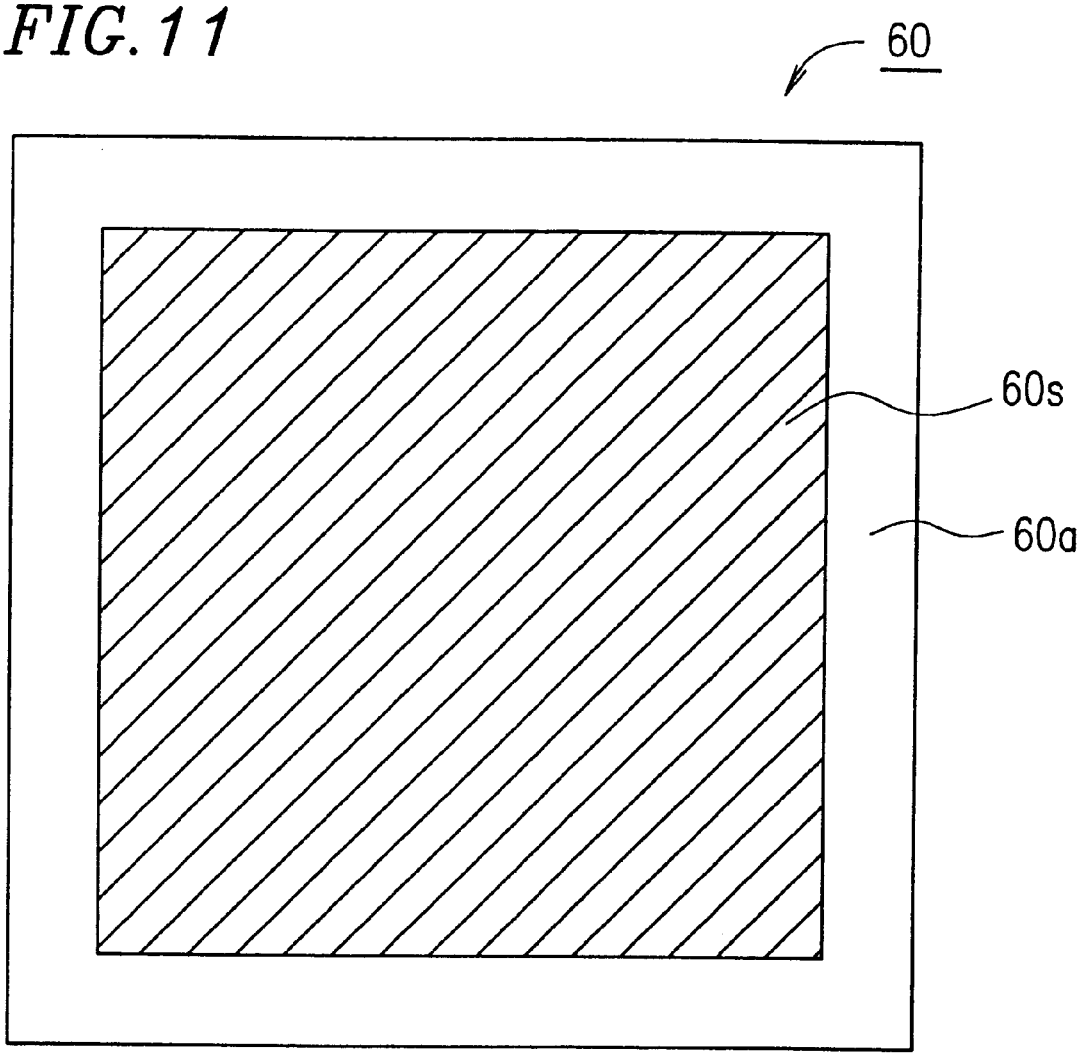

FIG.12A
FIG.12C
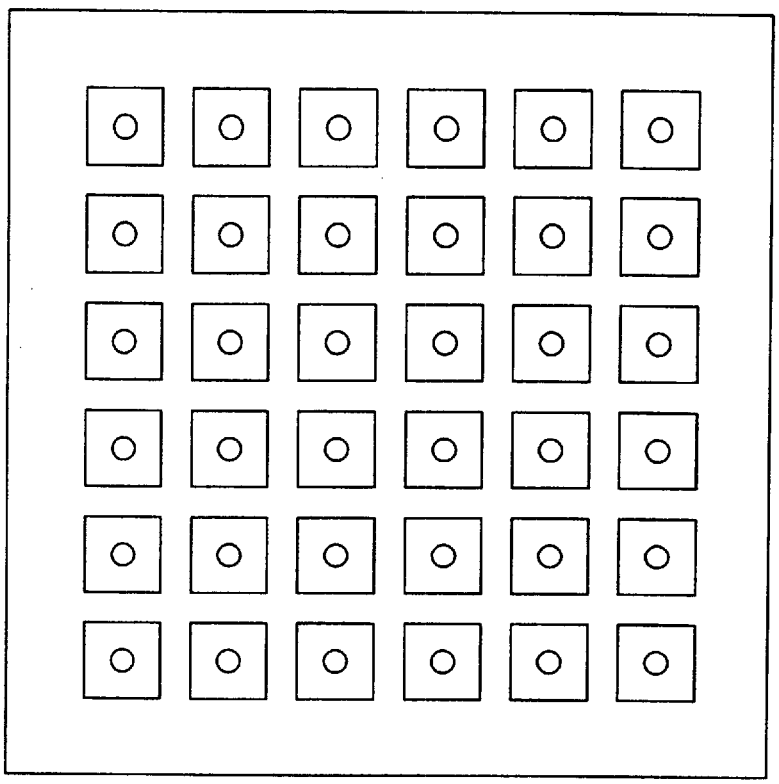
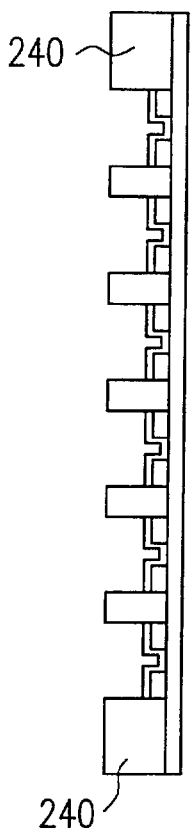
FIG.12B
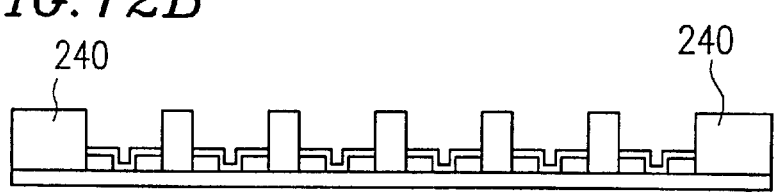

LIQUID CRYSTAL DISPLAY DEVICE AND METHOD FOR FABRICATING THE SAME

BACKGROUND OF THE INVENTION

1. Field of the Invention

The present invention relates to a liquid crystal display device (hereinafter, ref erred to as an LCD device) having wide viewing angle display characteristics, and a method for fabricating the same.

2. Description of the Related Art

Japanese Laid-Open Publication Nos. 6-301015 and 7-120728 disclose a technique of providing wide viewing angle characteristics for an LCD device. Such a technique includes steps of: dividing a liquid crystal layer into liquid crystal domains by surrounding regions thereof corresponding to pixels by a polymer wall; and aligning liquid crystal molecules in the respective liquid crystal domains in an axial symmetrical manner. Such a technique is called an axial symmetrically aligned microcell (ASM) technique. Using the ASM technique, an LCD device having a reduced change in contrast when the angle at which an observer views the LCD device changes in any direction (i.e., having wide viewing angle characteristics) is obtained.

In such an ASM mode, the control of the position of a symmetric axis (the axial position) is important. For example, as shown in FIG. 14, respective pixels have different axial positions $500a$ to $500f$. When an observer views the LCD device while tilting the LCD device, the area of each pixel where the contrast changes and the area thereof where the contrast does not change vary depending on the pixels. As a result, the variation in the axial position among the pixels is observed as a difference in brightness among the pixels, thereby significantly reducing the display quality. This phenomenon is perceived by the observer as "roughness" of the screen.

Japanese Laid-Open Publication No. 8-292423 proposes a structure for overcoming the above problem, where concave portions or protrusions are formed for respective pixels for controlling the axial positions of the pixels. More specifically, an overcoat resin layer is formed on a colored layer, and a concave portion is formed on the overcoat resin layer. However, the publication does not disclose any concrete method for fabricating such a structure. The publication neither teaches nor suggests any other method for forming a concave portion other than a method for forming a concave portion on the overcoat resin layer.

Fujitsu Ltd. suggests a multi-domain vertical alignment (MVA) mode LCD device as another LCD device having wide viewing angle characteristics. The MVA mode utilizes a vertical alignment type liquid crystal cell and forms pyramid type protrusion structures on each of surfaces of a pair of glass substrates facing each other. The directions in which liquid crystal molecules fall are determined depending on respective tilted surfaces of the pyramid type protrusion structures. In other words, the directions in which liquid crystal molecules fall are not uniform over the liquid crystal cell, which enables the production of an LCD device having wide viewing angle characteristics. In the MVA mode, the protrusion structure is not necessarily disposed in the center of each pixel.

The above conventional method for fabricating the ASM mode LCD device includes several repetitions of a spin coat step and a photolithography step for forming concave portions in respective pixels. When a film is formed using the spin coat method, however, it is difficult to control the thickness of the film with high precision. Moreover, when a multilayer film is formed using the spin coat method, if a layer formed by a first spin coat step is uneven, a layer formed by a subsequent spin coat step is affected by the unevenness of the underlying layer. This further makes it difficult to control the thickness of the film with high precision. In addition, several repetition of the photolithography step (including resist application, light exposure, and development) increases the possibility of an occurrence of a factor which can reduce the yield, such as positional displacement and attachment of foreign matters. For the above reasons, in the conventional fabrication method, it is difficult to simplify the steps and suppress the production cost.

In the conventional method, a number of steps are required to form concave portions on a color filter layer substrate, thereby reducing the yield. Moreover, since colored layers constituting color filter layers are formed by the spin coat method, the thickness of the layers is not likely to be uniform, degrading the display characteristics of the color filter layers (Y value and chromaticity). In particular, when a thick layer is required, it is not possible to control the thickness over a wide area of the layer. Moreover, since an overcoat resin layer needs to be formed on each colored layer, such problems that the concave portions of respective pixels are not uniform and that the concave portions are buried within the overcoat resin, arise.

SUMMARY OF THE INVENTION

The liquid crystal display device of this invention includes a first substrate, a second substrate opposing the first substrate, and a liquid crystal layer sandwiched between the first and the second substrates, wherein the liquid crystal layer includes a polymer region and a liquid crystal domain surrounded by the polymer region in which liquid crystal molecules are oriented in an axial symmetrical manner, the first substrate includes a dry film having a concave portion on a surface facing the liquid crystal layer, and a symmetric axis in the liquid crystal domain substantially extends through the concave portion and is substantially perpendicular to the first substrate.

In one embodiment of the invention, the dry film is a colored film.

In another embodiment of the invention, the colored film is located on a colorless film having an opening.

In still another embodiment of the invention, the dry film is a colorless film, the colorless film has an opening, and the colorless film is located on a colored film.

In still another embodiment of the invention, the second substrate includes a channel portion in which a rare gas is enclosed and an anode electrode and a cathode electrode disposed inside the channel portion, and a potential difference is provided in the liquid crystal domain by applying a voltage between the anode electrode and the cathode electrode to generate plasma discharge in the channel portion.

Alternatively, the liquid crystal display device of this invention includes a first substrate, a second substrate opposing the first substrate, and a liquid crystal layer sandwiched between the first and the second substrates, wherein the liquid crystal layer includes a polymer region and a liquid crystal domain surrounded by the polymer region in which liquid crystal molecules are oriented in an axial symmetrical manner, the first substrate includes a transparent electrode having a concave portion on a surface facing the liquid crystal layer, and a symmetric axis in the liquid crystal domain substantially extends through the concave portion and is substantially perpendicular to the first substrate.

In another embodiment of the invention, the second substrate includes a channel portion in which a rare gas is enclosed and an anode electrode and a cathode electrode disposed inside the channel portion, and a potential difference is provided in the liquid crystal domain by applying a voltage between the anode electrode and the cathode electrode to generate plasma discharge in the channel portion.

According to another aspect of the invention, a method for fabricating a liquid crystal display device is provided. The method includes the steps of: forming a dry film on a first substrate; forming a concave portion on the dry film; arranging the first substrate to face a second substrate so that the concave portion of the dry film is located inside; injecting a precursor mixture of a polymerizable material and a liquid crystal material in a space between the first and second substrates; forming a polymer region and a liquid crystal domain surrounded by the polymer region in which liquid crystal molecules are oriented in an axial symmetrical manner by subjecting the precursor mixture to phase separation polymerization; and controlling the liquid crystal domain during the phase separation polymerization so that a symmetric axis in the liquid crystal domain substantially extends through the concave portion and is substantially perpendicular to the first substrate.

In one embodiment of the invention, the step of forming a concave portion on the dry film includes the step of partly removing a colored dry film in a thickness direction.

In another embodiment of the invention, the step of forming a concave portion on the dry film includes the steps of: forming a colorless dry film having an opening; and forming a colored dry film on the colorless dry film.

In still another embodiment of the invention, the step of forming a concave portion on the dry film includes the steps of: forming a colored dry film; forming a colorless dry film on the colored dry film; and forming an opening on the colorless dry film.

Alternatively, the method for fabricating a liquid crystal display device of this invention includes the steps of: forming a transparent electrode on a first substrate; forming a concave portion on the transparent electrode; arranging the first substrate to face a second substrate so that the concave portion of the transparent electrode is located inside; injecting a precursor mixture of a polymerizable material and a liquid crystal material in a space between the first and second substrates; forming a polymer region and a liquid crystal domain surrounded by the polymer region in which liquid crystal molecules are oriented in an axial symmetrical manner by subjecting the precursor mixture to phase separation polymerization; and controlling the liquid crystal domain during the phase separation polymerization so that a symmetric axis in the liquid crystal domain substantially extends through the concave portion and is substantially perpendicular to the first substrate.

Thus, according to the present invention, since a concave portion for each pixel region can be formed on a color filter layer, an increase in the number of steps can be minimized.

When the concave portion is formed on a colored layer which is to be a color filter layer, the concave portion of the colored layer tends to become thin. If the colored layer is not thick enough, the thickness of the concave portion is insufficient, causing decoloration. In order to prevent this problem, according to the present invention, the thickness of the colored layer is made larger by about 10% compared with a colored layer which has no concave portion.

By forming the color filter layer using a dry film resist, a uniform thickness is obtained over a wide area even if the color filter layer is thick. This enables the production of a color filter layer which is uniform in the Y value and chromaticity according to the CIE standard in the plane of the substrate. Moreover, since the concave portion in each pixel region is shallow according to the present invention, the display characteristics of the color filter layer are not degraded.

According to the fabrication method of the present invention, the concave portion in each pixel region may be formed on a colorless dry film. In this case, since the color filter layers for pixels of the same color have the same thickness, the display characteristics of the color filter layers are not degraded.

When the concave portion is formed on a colorless dry film formed on a colored layer, no processing is performed on the colored layer. Accordingly, the color characteristics and the brightness are not degraded.

When the concave portion is formed on a transparent electrode, the fabrication steps can be simplified if the present invention is applied to a large-scale liquid crystal display device which uses a thick transparent electrode.

Thus, the invention described herein makes possible the advantages of (1) providing an ASM mode liquid crystal display device capable of easily controlling the axial positions, and (2) providing a method for fabricating such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIGS. 3A through 3E are views illustrating a light shading portion of a light reducing mask used in the embodiments according to the present invention;

FIG. 11 is a view illustrating a light shading mask used in the embodiments according to the present invention;

FIG. 12A is a plan view of a black film resist formed using the light shading mask of FIG. 11;

FIGS. 12B and 12C are sectional views of the black film resist of FIG. 12A;

DESCRIPTION OF THE PREFERRED EMBODIMENTS

Preferred embodiments of the present invention will be described with reference to the accompanying drawings. Hereinafter, the present invention is applied to a plasma address liquid crystal (PALC) display device in combination with the above-described technique of obtaining the wide viewing angle characteristics. Such a plasma address liquid crystal display device (hereinafter, referred to as a PALCD device) may be of a transmission type or a reflection type.

Hereinafter, the term "pixel region" as used herein will be described. A liquid crystal display (LCD) device according to the present invention has a plurality of pixel regions for display. Each pixel region represents a component of an LCD device, constituting one pixel which is a minimum unit for display. Typically, in an active matrix LCD device having a counter electrode and a plurality of pixel electrodes arranged in a matrix which are switched by respective active elements (e.g., TFTs), each pixel region includes each pixel electrode, a portion of the counter electrode corresponding to the pixel electrode, and a corresponding liquid crystal domain interposed therebetween. In a single matrix LCD device having stripe-shaped electrodes (scanning electrodes and signal electrodes) formed on different substrates to cross each other with a liquid crystal layer therebetween, each pixel region includes a crossing region between the two stripe-shaped electrodes and a liquid crystal domain interposed therebetween.

In a color display device, color display is is realized in an additive color mixture method by forming a color filter region at a position corresponding to each pixel region so as to allow light passing through the color filter region to be controlled by the pixel region. Typically, three pixel regions, i.e., a red (R) pixel region, a green (G) pixel region, and a blue (B) pixel region, constitute one color picture element region. The color filter regions are regions of a color filter.

One liquid crystal domain does not necessarily correspond to one pixel region. In order to improve the display quality, however, each liquid crystal domain is preferably formed for each pixel region. In the case of a pixel having a large aspect ratio (a long pixel), a pluralityof pixel regions maybe formed for one long pixel. The number of liquid crystal domains formed for one pixel is preferably as small as possible as long as axial symmetrical orientation is stably established.

Embodiment 1

Figure 1A:
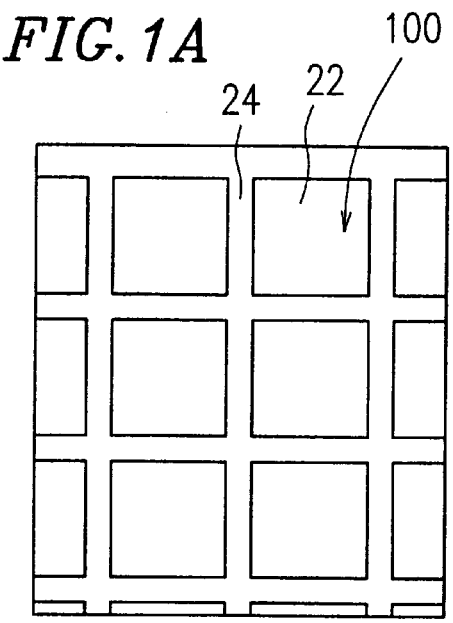
FIG. 1A is a plan view of a color filter layer (CF) substrate of a plasma address liquid crystal display (PALCD) device of Embodiment 1 according to the present invention.
Figure 1C:
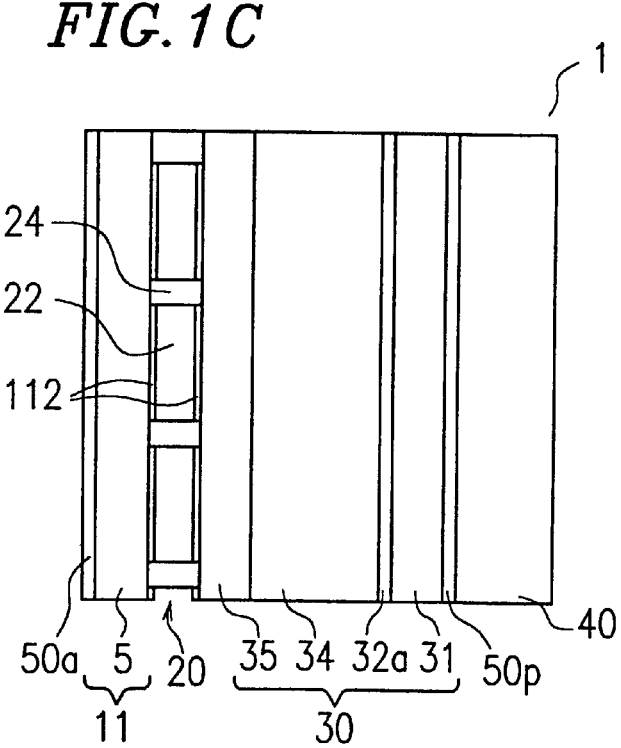
FIGS. 1B and 1C are sectional views of the PALCD device including the CF substrate of FIG. 1A.
Figure 1B:
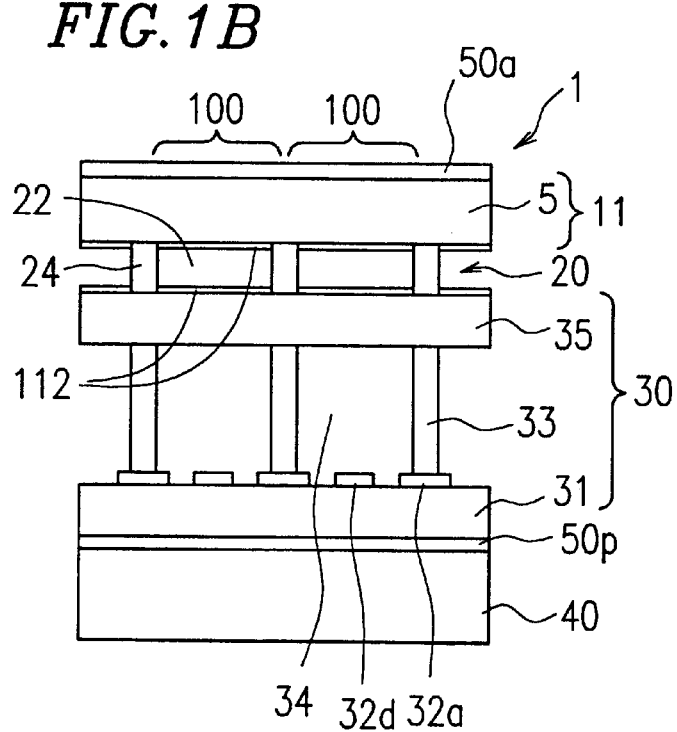

Referring to FIGS. 1A to 1C, a PALCD device 1 of Embodiment 1 according to the present invention will be described. FIG. 1A is a plan view of a color filter layer (CF) substrate 11 of the PALCD device 1. FIG. 1B is a sectional view of the PALCD device 1 including the CF substrate 11 shown in FIG. 1A. FIG. 1C is a sectional view of the PALCD device 1, showing a plasma switch (PS) substrate 30 in detail.

The PALCD device 1 includes the first substrate (e.g., the CF substrate) 11, the second substrate (e.g., the PS substrate) 30, and a liquid crystal layer 20 sandwiched by these substrates 11 and 30. Polarizing plates 50a and 50p may be disposed on the outer surfaces of the CF substrate 11 and the PS substrate 30, respectively. A surface emitting backlight 40 is disposed on the outer surface of the polarizing plate 50p. The directions of polarization axes of the two polarizing plates 50a and 50p are perpendicular to each other, allowing the PALCD device 1 to operate in a crossed Nicols state.

The liquid crystal layer 20 has liquid crystal domains 22 and a polymer region 24. Each of the liquid crystal domains 22 is composed of a liquid crystal drop substantially surrounded by the polymer region 24. In this embodiment, one liquid crystal domain 22 corresponds to one pixel region 100 (see FIG. 1A). Liquid crystal molecules in each liquid crystal domain 22 are oriented in an axial symmetrical manner. The liquid crystal layer 20 is in contact with vertical alignment films 112 formed on the inner surfaces of the CF substrate 11 and the PS substrate 30.

Figure 15A:
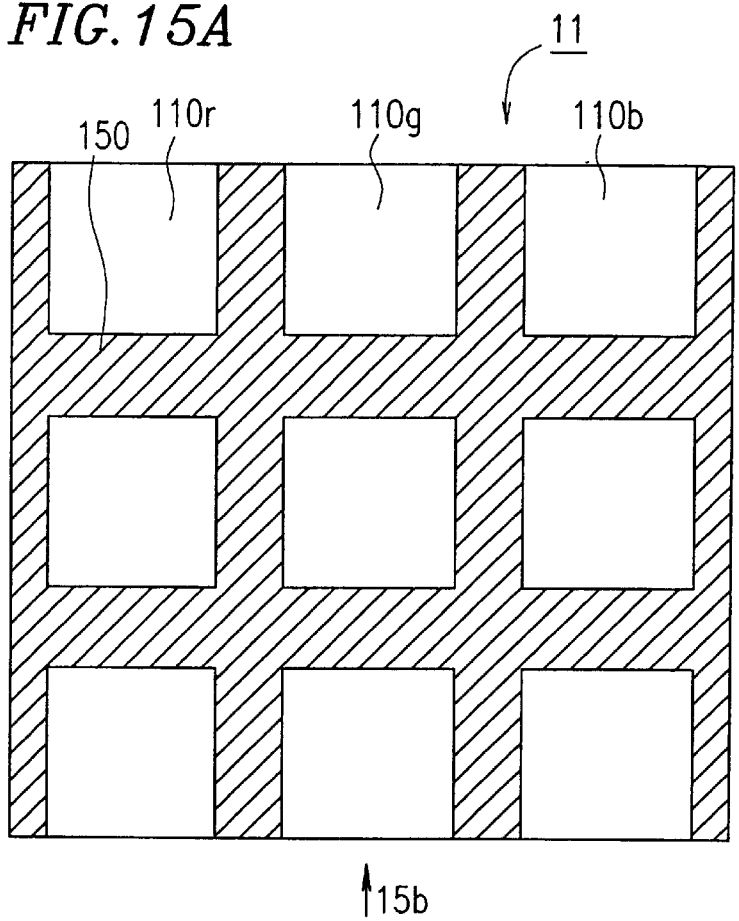
FIG. 15A is a plan view of the CF substrate of the PALCD device of Embodiment 1 according to the present invention.
Figure 15C:
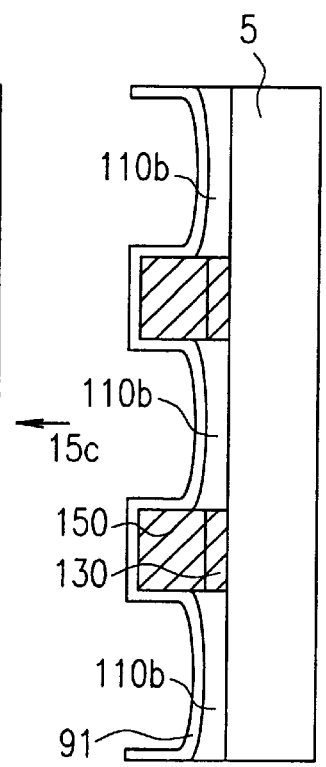
FIGS. 15B and 15C are sectional views of the CF substrate of FIG. 15A.
Figure 15B:
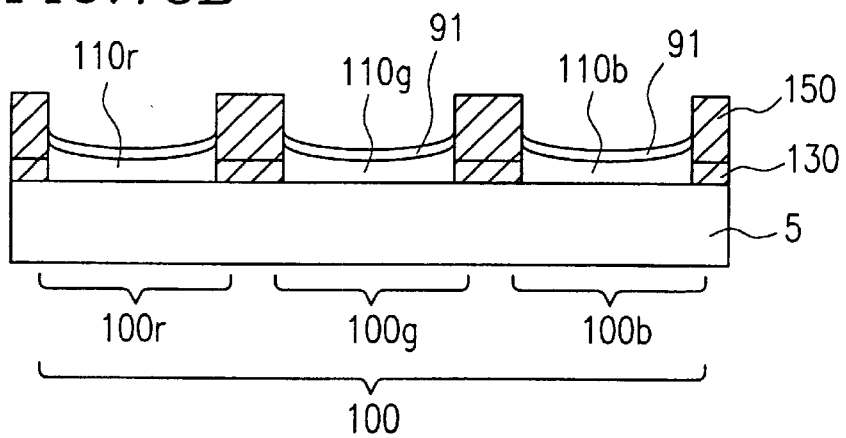

Referring to FIGS. 15A to 15C, the CF substrate 11 will be described in detail. FIG. 15A is a schematic plan view of the CF substrate 11. FIGS. 15B and 15C are sectional views of the CF substrate 11 of FIG. 15A, observed in directions indicated by arrows 15b and 15c, respectively. The CF substrate 11 includes a light transparent substrate 5 and colored layers 110r, 110g, and 110b formed on the light transparent substrate 5. The colored layers 110r, 110g, and 110b which have red (R), green (G), and blue (B) colors, respectively, are formed to correspond to red, green, and blue pixel regions 100r, 100g, and 100b, respectively. The CF substrate 11 further includes a black mask 130 formed to correspond to gaps between the adjacent pixel regions 100r, 100g, and 100b, and a resist wall 150 formed on the black mask 130.

Stripe-shaped light transparent conductive films 91 are formed on the colored layers 110r, 110g, and 110b extending along respective columns of the pixel regions 100 (100r, 100g, and 100b) of the same colors. The direction in which the light transparent conductive films 91 extend is perpendicular to the direction in which channels 34 of the PS substrate 30 extend (see FIGS. 1B and 1C). The light transparent conductive films 91 are omitted in FIG. 15A.

Each of the colored layers 110r, 110g, and 110b of the CF substrate 11 is composed of a dry film and functions as a color filter layer. As shown in FIG. 2J, each of the colored layers 110r, 110g, and 110b has a concave portion 160. Therefore, the thickness of each of the colored layers 110r, 110g, and 110b becomes gradually smaller from the periphery of the pixel region toward the center thereof, at which the thickness is the smallest.

Due to the existence of the concave portion 160, the symmetric axis for axial symmetric orientation of liquid crystal molecules is substantially vertical to the surface of the substrate 5 and extends through substantially the center of the pixel region. Therefore, the symmetric axes can be set at substantially the same positions for all pixels. As a result, the roughness of the display screen can be prevented.

As a dry film used as the color filter layer, one having a layered structure of "a base layer—an auxiliary layer—an intermediate layer—a colored layer—a cover film" is commercially available. The base layer supports the entire color filter layer since the colored layer is too thin to support itself and is peeled off after lamination. The auxiliary layer is made of a material which is promptly softened upon application of heat and serves as a buffer layer for allowing the colored layer to follow a preformed uneven pattern. The intermediate layer precludes air from entering the layered structure in order to prevent the colored layer from being adversely affected by the air when the colored layer is cured in a light exposure step. The colored layer is cured by being exposed to light to provide a color of the color filter layer.

By using such a dry film resist, a color filter layer having a uniform thickness over a wide area can be formed even if the colored layer 110$r$, 110$g$, or 110$b$ is made thick for the formation of a concave portion. Thus, a color filter layer with a uniform Y value and chromaticity over the substrate plane can be formed.

Referring back to FIGS. 1B and 1C, the PS substrate 30 includes a light transparent substrate 31, a dielectric layer 35, a plurality of partitions 33 disposed between the light transparent substrate 31 and the dielectric layer 35, and channels (plasma generation regions) 34 each sandwiched by the adjacent two partitions 33. Each of the channels 34 includes an anode electrode 32$a$ and a cathode electrode 32$d$ formed on the light transparent substrate 31 in a row direction (a direction normal to the plane of the sheet of FIG. 1B). Each of the channels 34 is charged with a rare gas (not shown) for generating plasma discharge. In this embodiment, both the light transparent substrate 31 and the dielectric layer 35 are made of glass. The thickness of the light transparent substrate 31 is about 2 mm.

(Thickness of Dry Film, in Particular, Colored Layer)

When the colored layer of the color filter layer is formed by painting, the colored layer should be made thin. If a thick colored layer is formed by painting, it is difficult to obtain a uniform thickness over a wide area. In order to directly form a concave portion on the colored layer, however, the colored layer must be made thicker than a normal layer by about 10 to 20% to prevent decoloration in the concave portion. Therefore, in order to prevent decoloration, the uniformity in thickness of the colored layer is sacrificed.

When a dry film is used for the colored layer, the colored layer can be made thick more easily than when the colored layer is formed by painting, while the thickness of the colored layer is kept uniform. In this way, the colored layer with a uniform thickness and free from decoloration can be obtained.

(Applicability of PALCD Device)

Since a PALCD device has a rib (partition) structure for plasma discharge, the aperture ratio thereof is significantly low. In order to overcome this problem, the pixel regions of the CF substrate needs to be made brighter compared with a TFT-driven display device. In the painting method, the colored layer is made thin and thus the resultant pixel regions are bright. However, when it is attempted to form a concave portion on the colored layer formed by the painting method, the problem of decoloration occurs as described above. It is therefore impossible to form a concave portion on a colored layer in the PALCD device.

When a dry film is used for the colored layer, the colored layer can be made thick, allowing for the formation of a concave portion without an occurrence of decoloration. Moreover, a bright color filter layer can be obtained by reducing the content of a pigment in the dry film. Accordingly, a concave portion can be formed on the colored layer by using a dry film for the colored layer in the PALCD device.

(Formation of Concave Portion on CF Substrate by Arranging Light Reducing Mask on Center of Pixel)

(Light Reducing Mask)

In general, a photomask used in photolithography is composed of light transmissive portions and light shading portions. In the case of using a negative photosensitive material, portions of the photosensitive material which are irradiated with light are cured, while the other portions which are not irradiated with light are remained uncured, resulting in only the irradiated portions being patterned (left unremoved) in a subsequent developing process.

A photomask used in this embodiment includes light reducing portions which transmit reduced light, not block light. When a light shading portion of a photomask is as small as about 10 $\mu$m or less in diameter, light is incident on a portion which is to be shaded from light by the light shading portion due to a light diffraction phenomenon. Thus, the portion is not shaded from light but exposed to light with a weak intensity. In this embodiment, this phenomenon is utilized to yield different degrees of curing of the colored resist depending on the positions of the colored resist, thereby forming a concave portion on the colored layer. Such a photomask used for the above purpose is herein referred to as a "light reducing mask" to differentiate from a normal photomask.

Thus, by using a dry film for the colored layer and using a light reducing mask in the light exposure processing of the colored layer, a concave portion can be formed on the colored layer without removing the concave portion or changing the color in the concave portion.

Hereinafter, a method for fabricating the CF substrate 11 will be described with reference to FIGS. 2A to 2J.

Figure 2A:
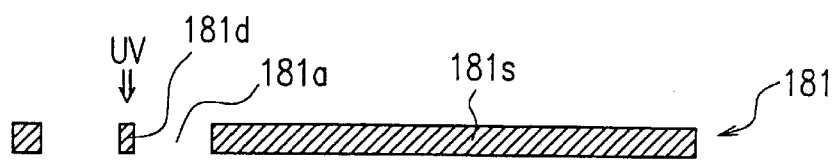
FIGS. 2A through 2J are sectional views illustrating a method for fabricating the CF substrate of the PALCD device of Embodiment 1.

Referring to FIG. 2A, a red dry film resist 105$r$ is adhered, under pressure, to the light transparent substrate 5 made of glass having a thickness of about 0.7 mm, for example, while heating the light transparent substrate 5. A base layer (not shown) of the dry film resist 105$r$ is then peeled off. The dry film resist 105$r$ is irradiated with ultraviolet (UV) light using a light reducing mask 181 having light transmissive portions 181$a$, light shading portions 181$s$ for light-shading the peripheries of the pixel regions 100$r$ which are to be red pixels, and light reducing portions 181$d$ for allowing reduced light to be transmitted to the centers of the pixel regions 100$r$ (FIG. 2F).

Each of the light reducing portions 181$d$ is preferably of a circular shape having about 10 $\mu$m or less in diameter or a rectangular shape having a side of about 10 $\mu$m. In this embodiment, the light reducing portion 181$d$ is of a circular shape. If the light reducing portion 181$d$ is greater than 10 $\mu$m in diameter, the dry film resist 105$r$ is completely removed in the center of the pixel region 100 in a subsequent developing process, resulting in decoloration in each pixel and thus degrading the color purity.

The formation of the concave portion on the colored layer can be improved by using any of mask patterns shown in FIGS. 3A to 3E for the plurality of the light reducing portion 181$d$. That is, by using such a pattern, a comparatively uniform UV light irradiation pattern can be obtained over the light reducing mask. As a result, uniform concave portions can be formed in the center of uniform pixel regions over the entire glass substrate. In this case, the photomask (i.e., the light reducing mask) is used to provide a variation in the intensity of light. Accordingly, if the light intensity distribution as shown in FIGS. 4A to 4C and 5A to 5C is obtained, whether or not the plurality of light shading regions 181$e$ in the patterns of FIGS. 3A to 3E are arranged regularly or not is not a problem.

Figure 2B:
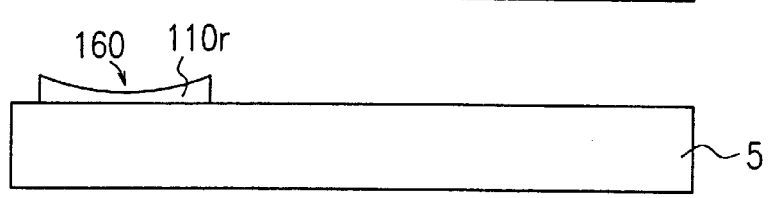
Figure 2C:
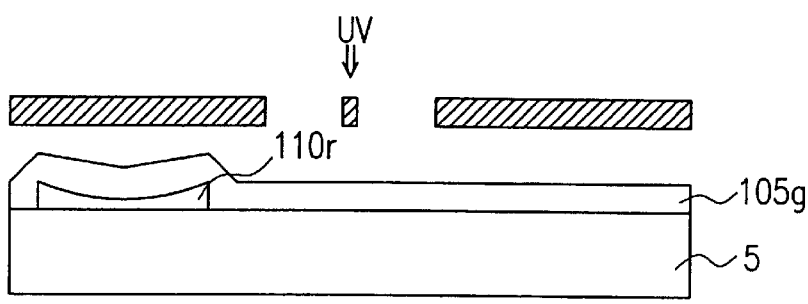
Figure 2D:
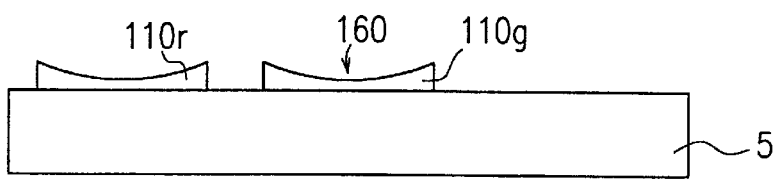
Figure 2E:
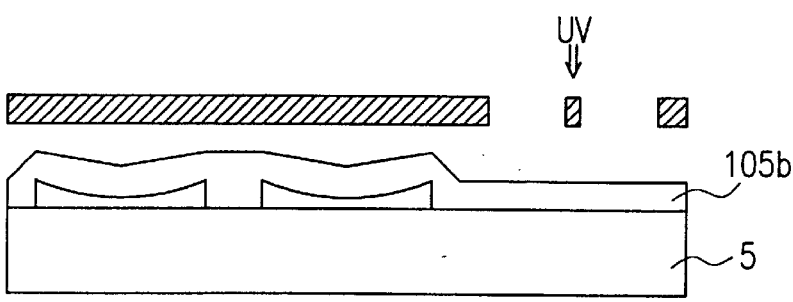
Figure 2F:
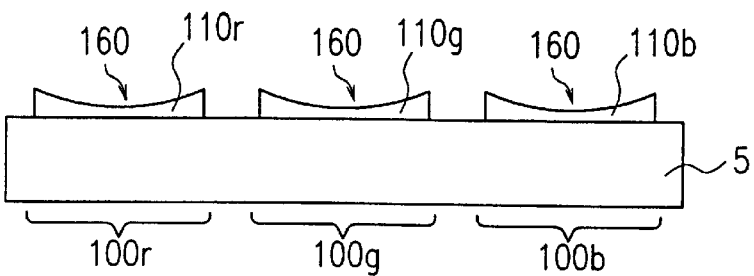

Referring to FIG. 2B, the dry film resist 105r is developed to remove the portions thereof which have not been exposed to the UV light, and the portions thereof corresponding to the centers of the pixel regions are partially removed in the thickness direction, thereby forming the colored layers 110r, each having the concave portion 160. Thereafter, the substrate 5 having the colored layers 110r formed thereon is irradiated with UV light again to heat the substrate for a fixed time period.

Referring to FIGS. 2C to 2F, a green dry film resist 105g and then a blue dry film resist 105b are adhered to the substrate 5, to form the green and blue colored layers 110g and 110b each having the concave portion 160 in the center thereof, respectively, through the steps of light exposure and development as described in the case of the colored layers 110r. Thus, the colored layers 110r, 110g, and 110b for the red pixel regions 100r, the green pixel regions 100g, and the blue pixel regions 100b are formed, respectively.

(Formation of Black Mask)

Figure 2G:
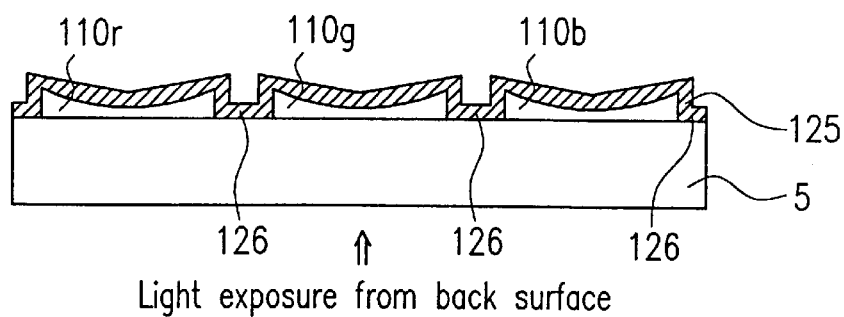
Figure 2H:
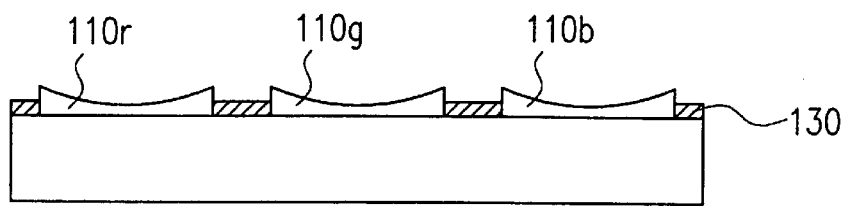

Referring to FIG. 2G, a black dry, film resist 125 is adhered, under pressure, to the resultant surface of the light transparent substrate 5 covering the colored layers 110r, 110g, and 110b, while heating the light transparent substrate 5. After the adhesion, a base layer (not shown) of the dry film resist 125 is peeled off. Thereafter, the substrate 5 is irradiated with UV light from the side thereof opposite to the side where the dry film resist 125 is formed. Since the colored layers 110r, 110g, and 110b contain an UV absorbent, the pixel regions 100r, 100g, and 100b do not transmit the UV light. Only the portions 126 of the black dry film resist 125 located in the gaps between the pixel regions are irradiated with the UV light. Thereafter, the substrate 5 is irradiated with UV light from the side thereof where the black dry film resist 125 is formed using a photomask 60 shown in FIG. 11. The photomask 60 has a light shading portion 60s covering all the pixel regions of the panel and a light transmitting portion 60a. The light shading portion 60s and the light transmitting portion 60a allow only the periphery of the panel to be irradiated with the UV light. The black dry film resist 125 is then developed to remove the portions which have not been exposed to light. The substrate 5 is irradiated with UV light again to heat the substrate for a fixed time period. In this way, as shown in FIG. 2H, a black mask 130 is formed in portions corresponding to the gaps 126 between the pixel regions of the substrate 5. Also, as shown in FIGS. 12A to 12C, a frame portion 240 is formed in the periphery of the display panel.

(Formation of Wall)

Figure 2I:
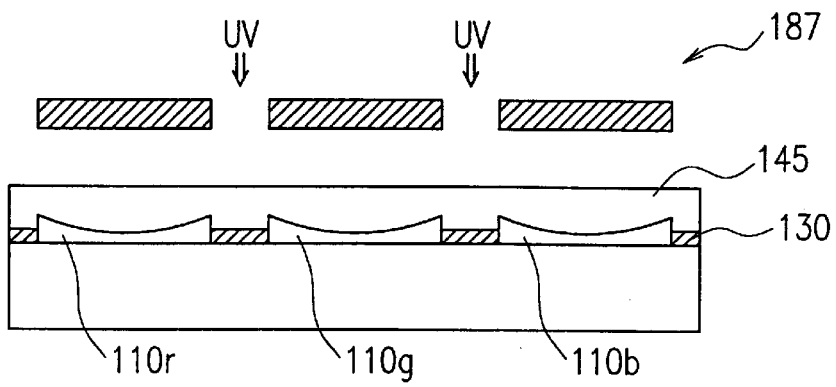
Figure 2J:
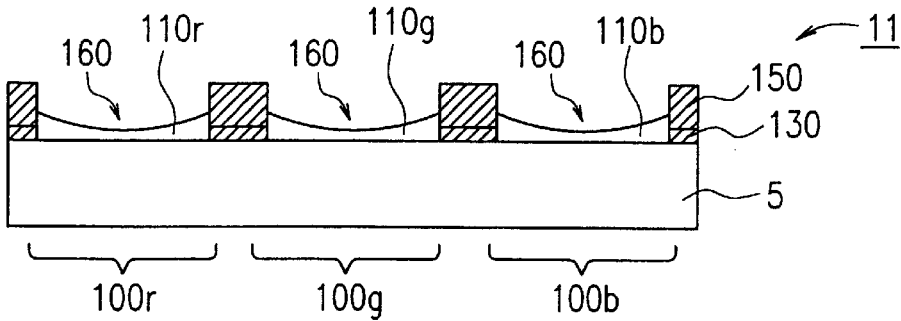
Figure 4A:
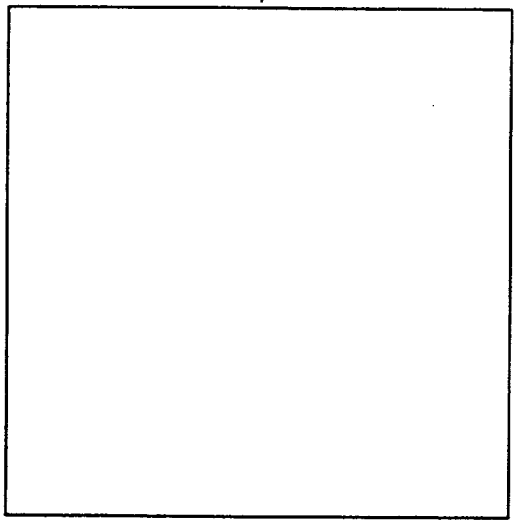
FIGS. 4A through 4C are graphs illustrating the intensity of light passing through the light reducing mask according to the present invention.
Figure 4C:
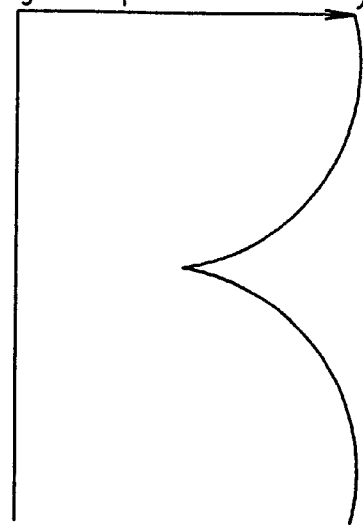
Figure 4B:
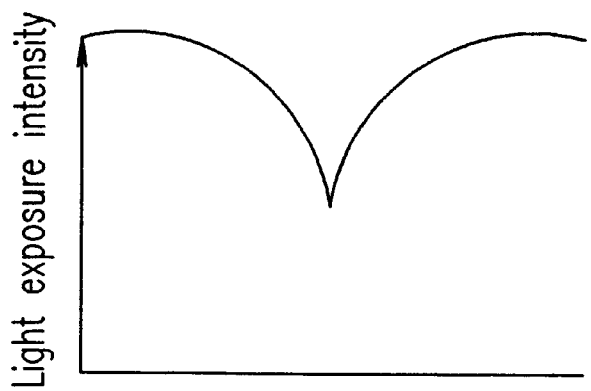
Figure 5A:
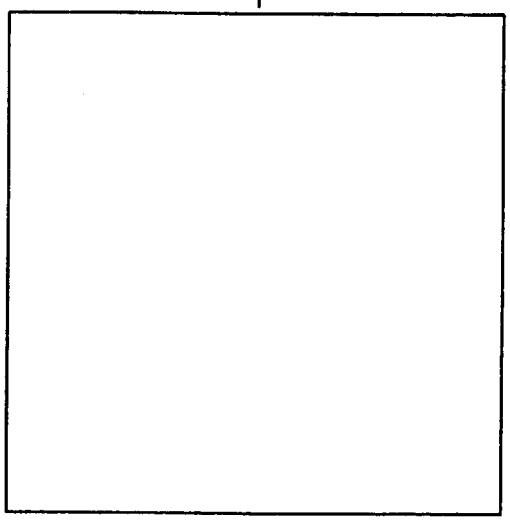
FIGS. 5A through 5C are graphs illustrating the intensity of light passing through the light reducing mask according to the present invention.
Figure 5C:
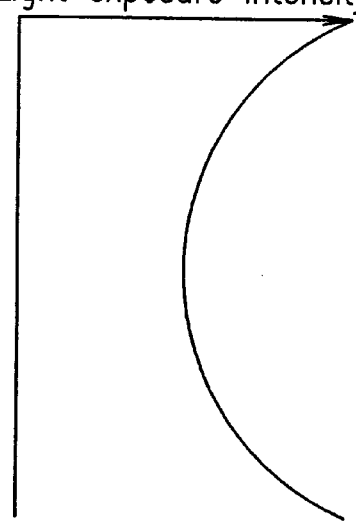
Figure 5B:
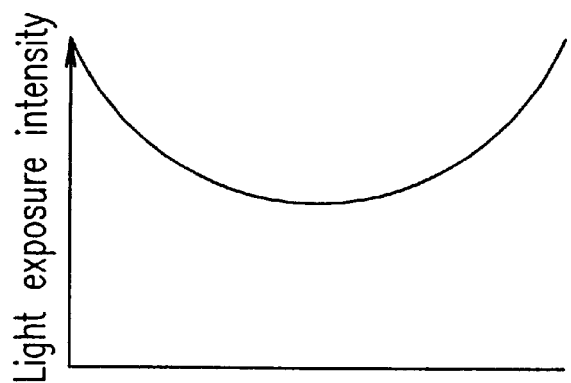

Referring to FIG. 2I, a negative resist 145 is applied to the resultant surface of the substrate 5 covering the black mask 130 and the colored layers 110r, 110g, and 110b. The negative resist 145 is exposed to light using a photomask 187 having light shading portions at positions corresponding to the respective pixel regions. The negative resist 145 is then developed to form the resist wall 150. The position of the top surface of the black mask 130 is lower than that of the colored layers 110r, 110g, and 110b. Accordingly, by forming the negative resist 145 along the pattern of the black mask 130, a resist wall 150 having a height of about 3 μm can be formed on the black mask 130. Thus, the CF substrate 11 shown in FIG. 2J is fabricated.

On the CF substrate 11 fabricated as described above through the steps shown in FIGS. 2A to 2J, the light transparent conductive film 91 (see FIGS. 15B and 15C) made of ITO is deposited by sputtering to a thickness of about 100 nm. The light transparent conductive film 91 is then etched to form a pattern of stripes extending along respective columns of the pixel regions of the same colors. The direction in which the stripe-shaped light transparent conductive films 91 extend is perpendicular to the direction in which the channels 34 of the PS substrate 30 extend.

Since each light transparent conductive film 91 extends so as to override portions of the resist wall 150 along the column of the pixel regions of the same color, disconnection is likely to occur at the overriding portions. In order to prevent this, the resist wall 150 may be tapered (i.e., the resist wall 150 may have a shape of a trapezoid with an upper side shorter than a lower side).

(Position of Concave Portion)

In the ASM technique, a concave portion is preferably formed in the center of each pixel region. In the case where a plurality of pixels constitute each RGB picture element, a concave portion is preferably formed in the center of each pixel, preferably one concave portion for each pixel. On the contrary, in an MVA technique, a concave portion may be formed at any position, and a plurality of concave portions may be formed in each pixel.

(Order of Adhesion of Colored Layers)

The colored layers 110r, 110g, and 110b have the same material construction, but are different in nature from one another. For example, the softness provided when heated is different from one another. A colored layer to be adhered secondly or subsequently needs to be soft enough to absorb any step of a pattern already formed in the previous step. Otherwise, a bubble may be formed during the adhesion of the colored layer, thereby failing to yield the desired pattern. In order to overcome this problem, a colored layer which is harder than others when heated is preferably adhered earlier.

(Difference in Heat Polymerization of Colored Layer)

The order of the adhesion of the colored layers 110r, 110g, and 110b is also restricted by the heat polymerization property of the colored layers. While the colored layers have a photopolymerization property, they can also be polymerized by heat. Each color has a different heat polymerization property from the others. When a second or subsequent colored layer is to be adhered, the peeling-off property of the previously formed colored layer is important. At the adhesion of each colored layer, a heating process is required to soften the colored layer. If the heat polymerization property of the colored layer is too high, the color is left unremoved on the previously formed pattern. In order to prevent this problem, a colored layer having a higher heat polymerization property is preferably adhered earlier.

Embodiment 2

Figure 6A:
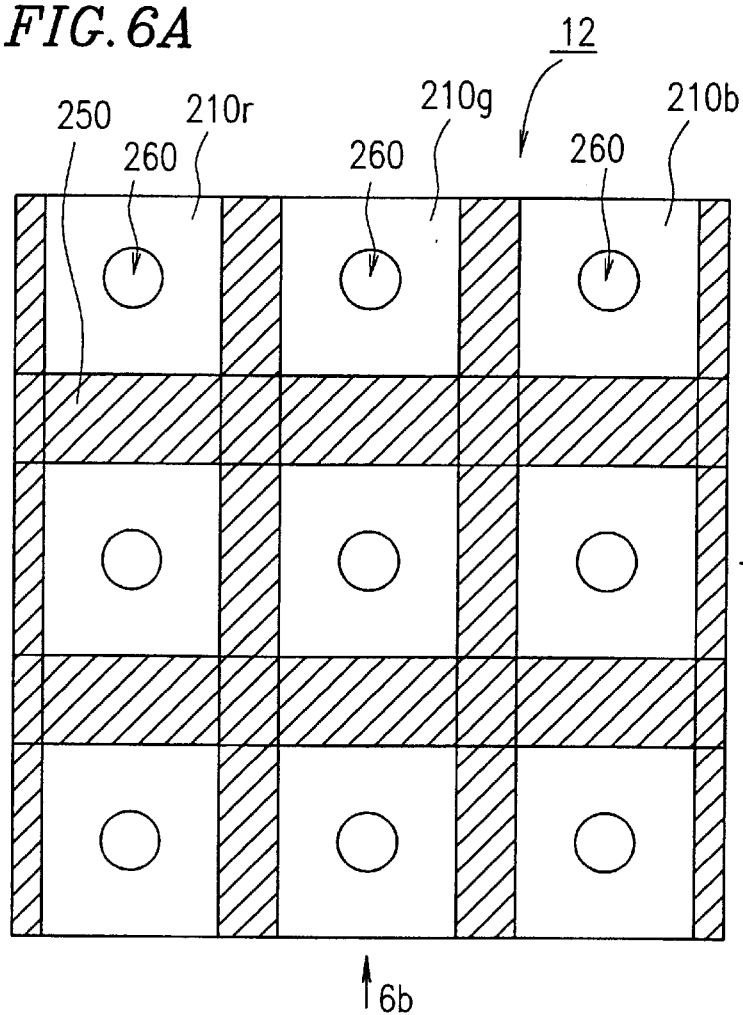
FIG. 6A is a plan view of a CF substrate of a PALCD device of Embodiment 2 according to the present invention.
Figure 6C:
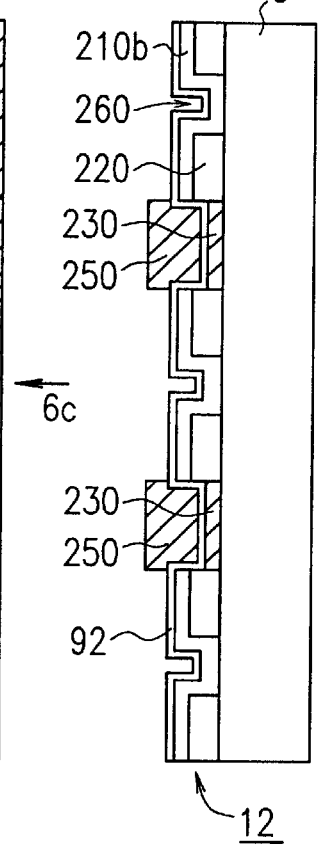
FIGS. 6B and 6C are sectional views of the CF substrate of FIG. 6A.
Figure 6B:
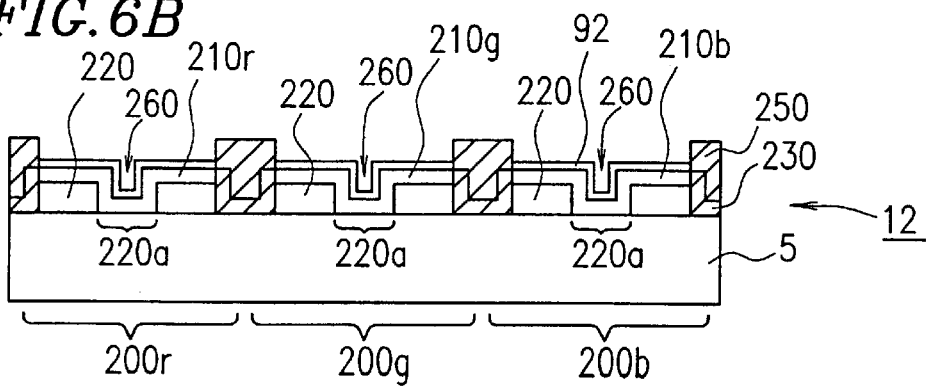

Referring to FIGS. 6A to 6C, a PALCD device 1 of Embodiment 2 according to the present invention will be described. FIG. 6A is a schematic plan view of a color filter layer (CF) substrate 12 of the PALCD device 1 of Embodiment 2. FIGS. 6B and 6C are sectional views of the CF substrate 12 of FIG. 6A, observed in directions indicated by arrows 6b and 6c, respectively.

The PALCD device 1 of Embodiment 2 is different from the PALCD device 1 of Embodiment 1 in that the CF substrate 12 replaces the CF substrate 11 of Embodiment 1. In Embodiment 2, a colorless dry film resist 215 is formed on the light transparent substrate 5, and openings 220a are formed through the colorless dry film resist 215 (FIG. 7A) at positions corresponding to the centers of the respective pixel regions. Using these openings 220a, concave portions 260 are formed in the centers of the pixel regions. Like components to those in Embodiment 1 are denoted by like reference numerals.

(Difference from Embodiment 1 where the Concave Portion is Formed on the Colored Layer)

As described in Embodiment 1, the light reducing portions of the light reducing mask are preferably made smaller when concave portions are formed on the colored layer, in order to prevent the concave portions of the colored layer from being completely removed in the thickness direction. If a portion of the colored layer is completely removed in the thickness direction, the color characteristics degrade. In Embodiment 2, on the other hand, in order to form steps in the colorless layers, the openings 220a formed through a colorless layer 220 need to have a comparatively large size.

Referring to FIGS. 6A to 6C, the configuration of the CF substrate 12 will be described. The CF substrate 12 includes colorless layers 220 made of the colorless dry film resist and the openings 220a formed on the light transparent substrate 5. The openings 220a are located in the centers of respective pixel regions 200. The CF substrate 12 further includes colored layers 210r, 210g, and 210b formed on the light transparent substrate 5 so as to cover the colorless layers 220 and the openings 220a. Each of the colored layers 210r, 210g, and 210b has a concave portion 260 at a position corresponding to the center of the pixel region 200 due to a step formed between the colorless layer 220 and the opening 220a.

Hereinbelow, a method for fabricating the CF substrate 12 of the PALCD device 1 of Embodiment 2 will be described with reference to FIGS. 7A to 7L.

Figure 7A:
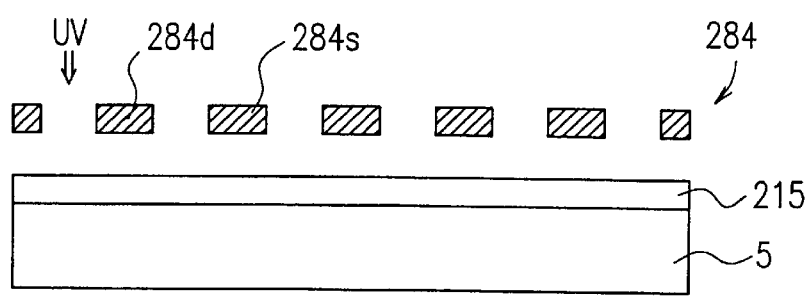
FIGS. 7A through 7L are sectional views illustrating a method for fabricating the CF substrate of the PALCD device of Embodiment 2.

Referring to FIG. 7A, the colorless dry film resist 215 which does not contain any pigment is adhered, under pressure, to the light transparent substrate 5 made of glass having a thickness of about 0.7 mm, for example, while heating the light transparent substrate 5. A base layer (not shown) of the colorless dry film resist 215 is then peeled off. The colorless dry film resist 215 is then irradiated with UV light using a photomask 284 having light shading portions 284s for light-shading gaps between the pixel regions 200 and light shading portions 284d for light-shading the centers of the pixel regions 200.

Each area of the colorless dry film resist 215 light-shaded by the light shading portion 284d preferably has a diameter or a side of about 50% or less of one side of each pixel region 200 and further the area has a diameter or a side of about 20 μm or more. In this embodiment, the area to be light-shaded is of a circular shape. If the area of the colorless dry film resist 215 light-shaded by the light shading portion 284d is greater than 50% of one side of each pixel region 200, the force of controlling the axial center of axial symmetrical orientation is lost. If the area is smaller than 20 μm, the portions of the colorless dry film resist 215 corresponding to the centers of the pixel regions 200 are removed in some cases but are not removed in other cases due to the resolution of the colorless dry film resist 215 in a subsequent developing process, thereby failing to form uniform steps in the first layer.

Figure 7B:
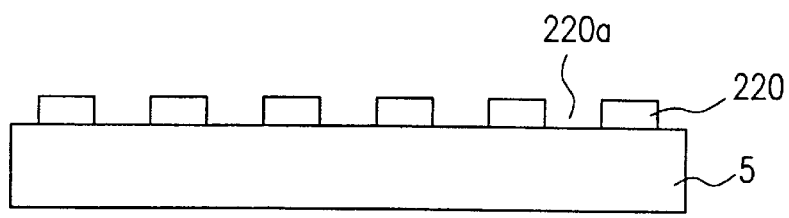

Referring to FIG. 7B, after the light exposure, the colorless dry film resist 215 is developed, to obtain the colorless layers 220 and the openings 220a located in the center of the pixel regions. The openings 220a may be circular or rectangular. The resultant light transparent substrate 5 is irradiated with UV light again to heat the substrate for a fixed time period.

Figure 7C:
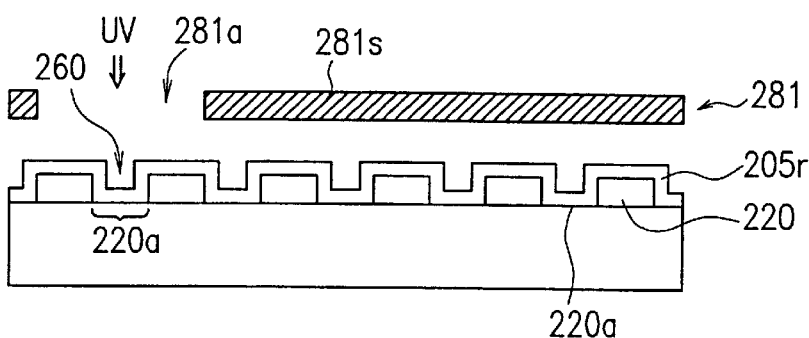
Figure 7D:
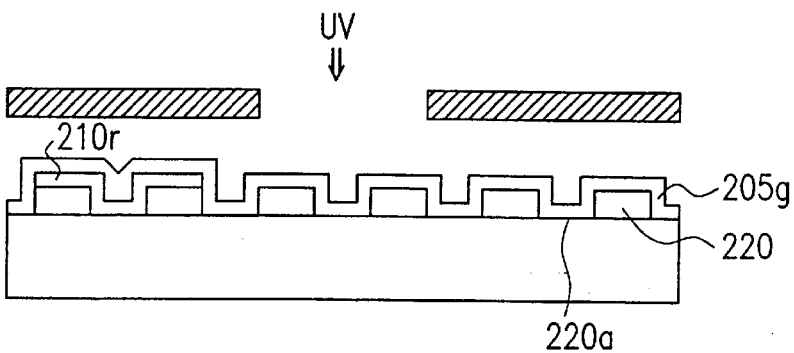
Figure 7E:
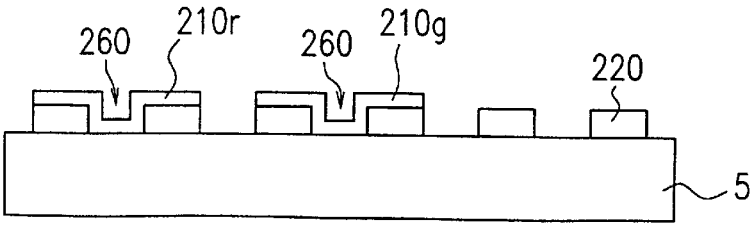
Figure 7F:
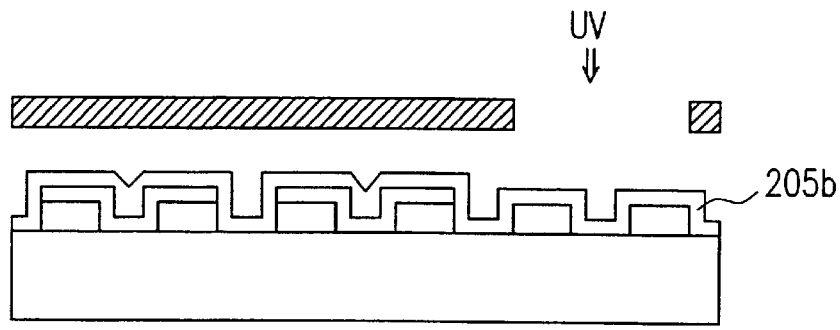
Figure 7G:
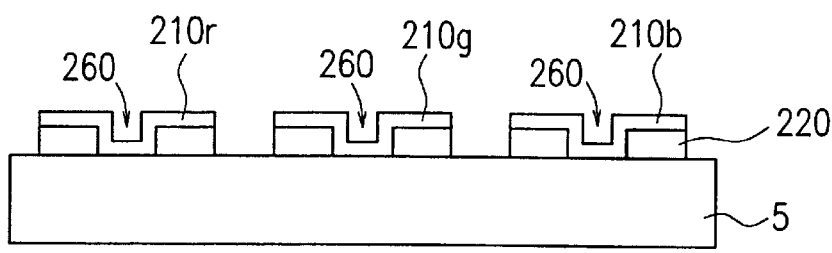

Referring to FIG. 7C, a red dry film resist 205r is adhered, under pressure, to the resultant light transparent substrate 5 covering the colorless layers 220 and the openings 220a. A base layer of the dry film resist 205r is then peeled off. The dry film resist 205r is irradiated with UV light via a photomask 281 having openings 281a for exposing to light red pixel regions 200r which are to become red pixels. The dry film resist 205r is then developed to obtain the red colored layers 210r formed on the colorless layers 220 and the openings 220a of the pixel regions 200r. The resultant light transparent substrate 5 is irradiated with UV light again to heat the substrate for a fixed time period. Thus, the colored layers 210r for the red pixel regions 200r (see FIG. 7L) is formed. Each of the colored layers 210r has the concave portion 260 at a position corresponding to the center of each pixel region 200r.

Referring to FIGS. 7D to 7G, a green dry film resist 205g and a blue dry film resist 205b are adhered to the substrate 5, to form the colored layers 210g and 210b each having the concave portion 260 in the center thereof, respectively, through the steps of light exposure and development as described in the case of the colored layers 210r. Thus, the colored layers 210r, 210g, and 210b for the red pixel regions 200r, the green pixel regions 200g, and the blue pixel regions 200b (see FIG. 7L) are formed. The order of the adhesion of the colored layers 210r, 210g, and 210b is not restricted.

(Formation of Black Mask)

Figure 7H:
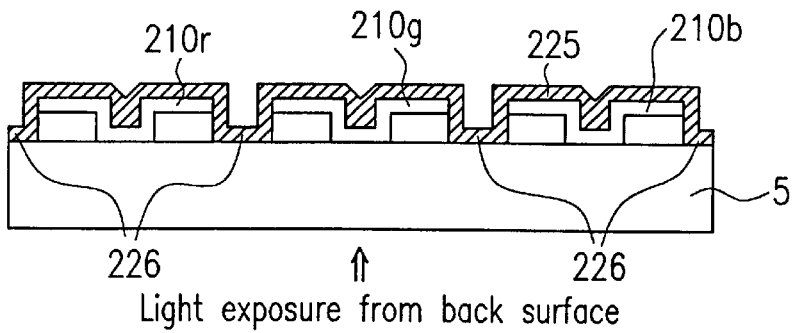
Figure 7I:
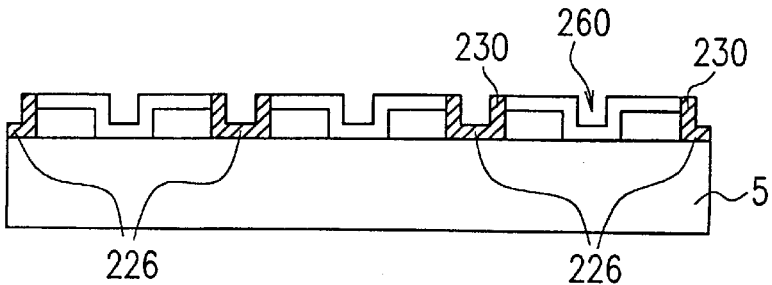

Referring to FIG. 7H, a black dry film resist 225 is adhered, under pressure, to the resultant surface of the light transparent substrate 5 covering the colored layers 210r, 210g, and 210b, while heating the light transparent substrate 5. After the adhesion, a base layer (not shown) of the black dry film resist 225 is peeled off. Thereafter, the substrate 5 is irradiated with UV light from the side thereof opposite to the side where the black dry film resist 225 is formed. Since the colored layers 210r, 210g, and 210b contain an UV absorbent, the pixel regions 200r, 200g, and 200b do not transmit the UV light. Only the portions of the black dry film resist 225 located in the gaps 226 between the pixel regions are irradiated with the UV light. Thereafter, the substrate 5 is irradiated with UV light from the side thereof where the black dry film resist 225 is formed using the photomask 60 shown in FIG. 11. The photomask 60 has the light shading portion 60s covering all the pixel regions of the panel and the light transmitting portion 60a. This light shading portion 60s and the light transmitting portion 60a allow only the periphery of the panel to be irradiated with the UV light. The black dry film resist 225 is then developed to remove the portions which have not been exposed to light. The substrate 5 is irradiated with UV light again to heat the substrate for a fixed time period. In this way, as shown in FIG. 7I, a black mask 230 is formed in portions corresponding to the gaps between the pixel regions of the substrate 5. Also, as shown in FIGS. 12A and 12B, a frame portion 240 is formed in the periphery of the display panel.

At this stage, ITO was deposited on the resultant surface of the CF substrate 12 to a thickness of about 100 nm by sputtering and then etched, to form stripe-shaped light transparent conductive films 92 (see FIGS. 6B and 6C) extending along respective columns of the pixel regions 200 (200r, 200g, and 200b) of the same colors. The direction in which the light transparent conductive films 92 extend is perpendicular to the direction in which the channels 34 of the PS substrate 30 extend (see FIGS. 1B and 1C).

(Formation of Wall)

Figure 7J:
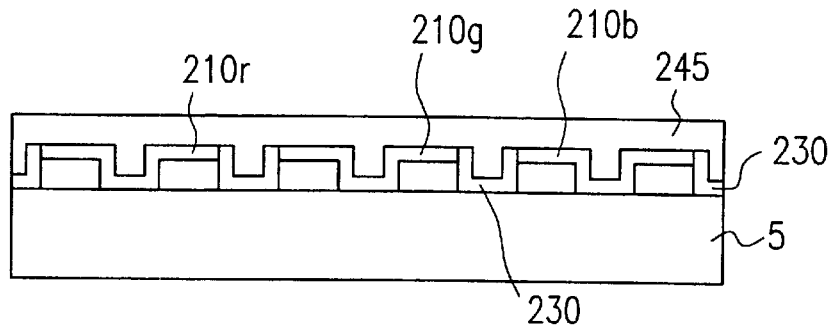
Figure 7K:
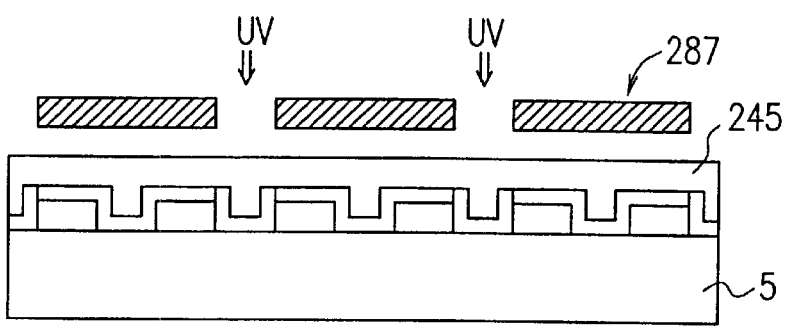
Figure 7L:
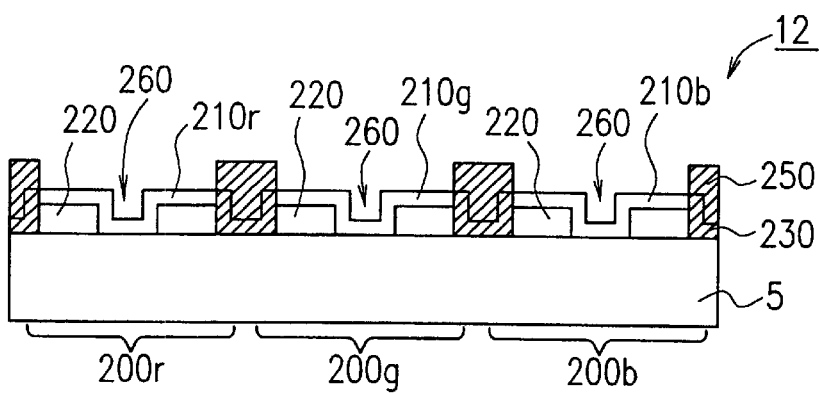

Referring to FIG. 7J, a negative resist 245 is applied to the resultant surface of the substrate 5 covering the black mask 230, and the colored layers 210r, 210g, and 210b. (In FIG. 7J, the light transparent conductive films 92 shown in. FIGS. 6B and 6C are omitted.) Referring to FIG. 7K, the negative resist 245 is exposed to light using a photomask 287 having light shading portions for light-shading the respective pixel regions. The negative resist 245 is then developed to form a resist wall 250 as shown in FIG. 7L. The position of the top surface of the black mask 230 is lower than that of the colored layers 210r, 210g, and 210b. Accordingly, by forming the negative resist 245 along the pattern of the black mask 230, a resist wall 250 having a height of about 3 μm can be formed on the black mask 230. Thus, the CF substrate 12 shown in FIG. 7L is fabricated.

Embodiment 3

A PALCD device 1 of Embodiment 3 according to the present invention will be described. FIG. 8G illustrates a color filter layer (CF) substrate 13 of the PALCD device 1 of Embodiment 3.

The PALCD device 1 of Embodiment 3 is different from the PALCD device 1 of Embodiment 1 in that the CF substrate 13 replaces the CF substrate 11 of Embodiment 1. In Embodiment 3, colored layers 310r, 310g, and 310b are formed on the substrate 5 and then a colorless dry film resist 315 (see FIG. 8B) is formed on the colored layers. Openings 320a (see FIG. 8D) are formed through the colorless dry film resist 315 at positions corresponding to the centers of the respective pixel regions. Using these openings 320a, concave portions 360 (see FIG. 8G) are formed in the centers of the pixel regions. The openings 320a are formed by irradiating the colorless dry film resist 315 using a photomask 384 (see FIG. 8C) having light shading portions corresponding to the centers of the pixel regions to weaken the intensity of light to be incident on the centers or shade the centers from light and then by developing the resultant colorless dry film resist 315. Like components to those in Embodiment 1 are denoted by like reference numerals.

Hereinbelow, a method for fabricating the CF substrate 13 of the PALCD device 1 of Embodiment 3 will be described with reference to FIGS. 8A to 8G.

Figure 8A:
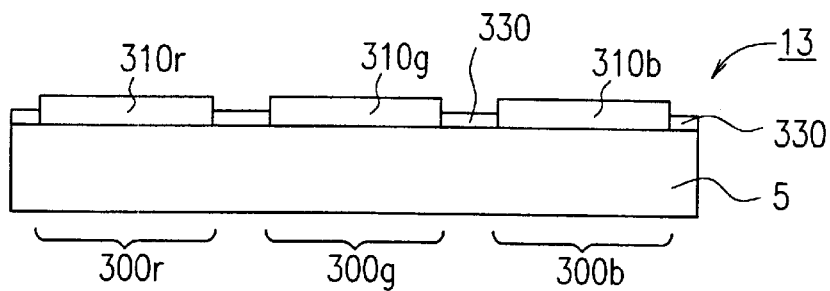
FIGS. 8A through 8G are sectional views illustrating a method for fabricating a CF substrate of a PALCD device of Embodiment 3 according to the present invention.

Referring to FIG. 8A, the colored layers 310r, 310g, and 310b corresponding to red (R), green (G), and blue (B) are formed on the light transparent substrate 5. A black dry film resist (not shown) is then adhered, under pressure, to the resultant substrate 5 covering the colored layers 310r, 310g, and 310b, while heating the substrate 5. After the adhesion, a base layer (not shown) of the black dry film resist is peeled off. The substrate 5 is then irradiated with UV light from the side thereof opposite to the side where the black dry film resist is formed. Since the colored layers 310r, 310g, and 310b contain an UV absorbent, pixel regions 300r, 300g, and 300b do not transmit the UV light. Only the portions of the black dry film resist located in the gaps between the pixel regions are irradiated with the UV light. Thereafter, the substrate 5 is irradiated with UV light from the side thereof where the black dry film resist is formed using the photomask 60 shown in FIG. 11. The photomask 60 has the light shading portion 60s covering all the pixel regions of the panel and the light transmitting portion 60a. This light shading portion 60s and the light transmitting portion 60a allow only the periphery of the panel to be irradiated with the UV light. The black dry film resist is then developed to remove the portions which have not been exposed to light. The substrate 5 is irradiated with UV light again to heat the substrate for a fixed time period. In this way, a black mask 330 is formed in portions corresponding to the gaps between the pixel regions of the substrate 5. Also, as shown in FIGS. 12A and 12B, a frame portion 240 is formed in the periphery of the display panel.

Figure 8B:
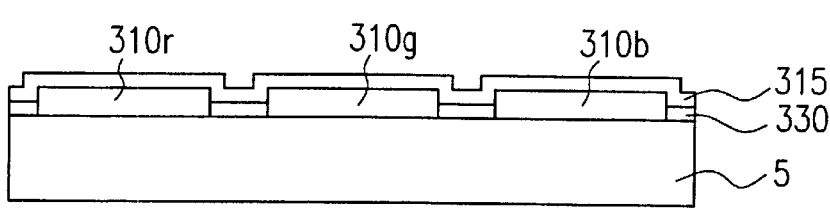

Referring to FIG. 8B, the colorless dry film resist 315 is adhered to the resultant light transparent substrate 5 covering the black mask 330 and the colored layers 310r, 310g, and 310b.

Figure 8C:
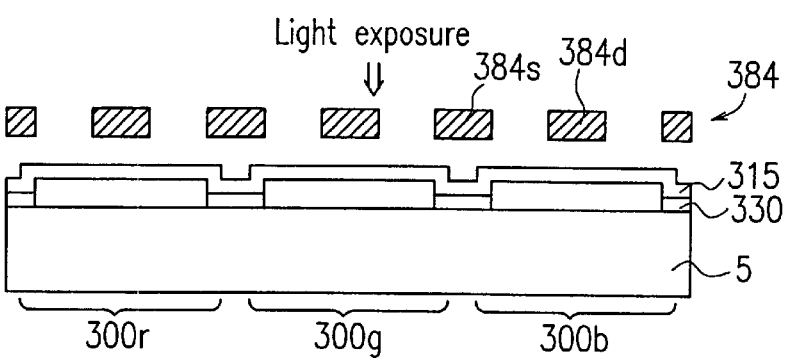

Referring to FIG. 8C, the colorless dry film resist 315 is then irradiated with UV light using the photomask 384 having light shading portions 384s for light-shading peripheries of the respective pixel regions 300 (300r, 300g, and 300b) and light shading portions 384d for light-shading the center portions of the respective pixel regions 300.

Figure 8D:
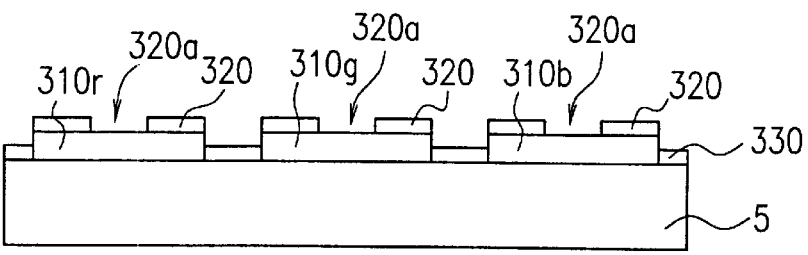

Referring to FIG. 8D, after the light exposure, the colorless dry film resist 315 is developed to obtain colorless layers 320 and the openings 320a located in the centers of the pixel regions. The openings 320a may be circular or rectangular. The light transparent substrate 5 is irradiated with UV light again to heat the substrate for a fixed time period. In this embodiment, the openings 320a themselves function as the concave portions 360.

At this stage, ITO was deposited on the resultant surface of the CF substrate 13 to a thickness of about 100 nm by sputtering and then etched, to form stripe-shaped light transparent conductive films (not shown) extending along respective columns of the pixel regions 300 (300r, 300g, and 300b) of the same colors. The direction in which the light transparent conductive films extend is perpendicular to the direction in which the channels 34 of the PS substrate 30 extend (see FIGS. 1B and 1C).

(Formation of Wall)

Figure 8E:
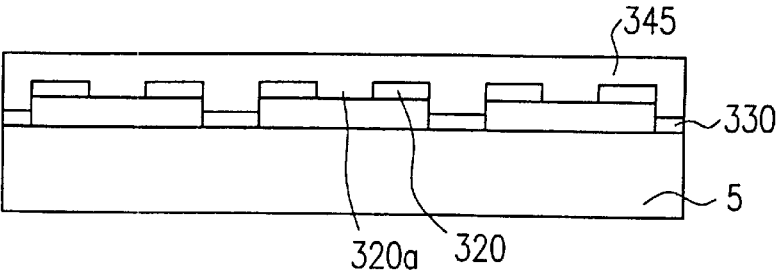
Figure 8F:
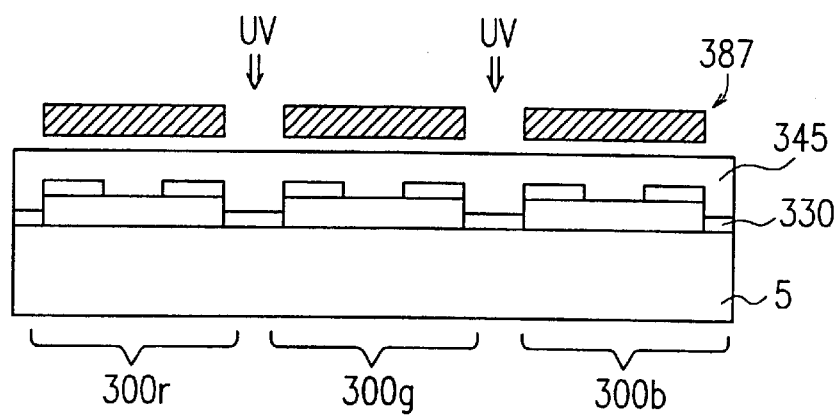
Figure 8G:
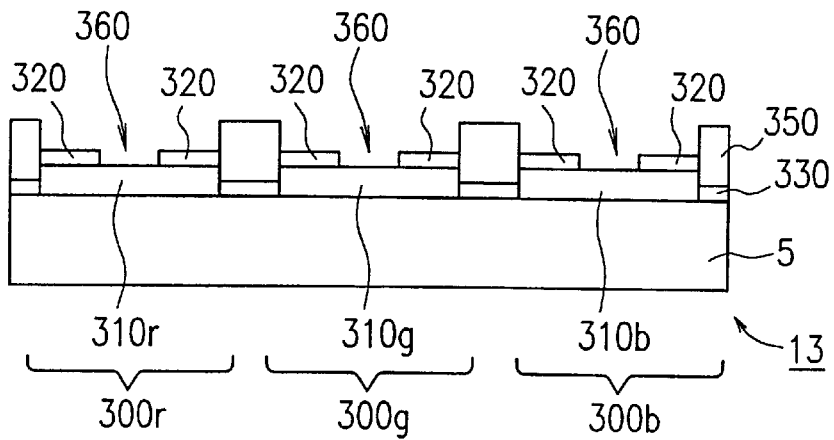

Referring to FIG. 8E, a negative resist 345 is applied to the resultant surface of the substrate 5 covering the black mask 330, the colorless layers 320, and the openings 320a. Referring to FIG. 8F, the negative resist 345 is exposed to light via a photomask 387 having light shading portions for light-shading the respective pixel regions 300 (300r, 300g, and 300b). The negative resist 345 is then developed to form a resist wall 350 as shown in FIG. 8G. The position of the top surface of the black mask 330 is lower than that of the colored layers 310r, 310g, and 310b. Accordingly, by forming the negative resist 345 along the pattern of the black mask 330, a resist wall 350 having a height of about 3 μm can be formed on the black mask 330. Thus, the CF substrate 13 shown in FIG. 8G is fabricated.

(Formation of Transparent Electrode)

Electrodes need to be formed for application of signals to the respective pixels. Such electrodes need to be transparent for a transmission type display device. A metal oxide such as ITO may be used for the electrodes. For a reflection type display device, the electrodes are not necessarily transparent.

Embodiment 4

Figure 9A:
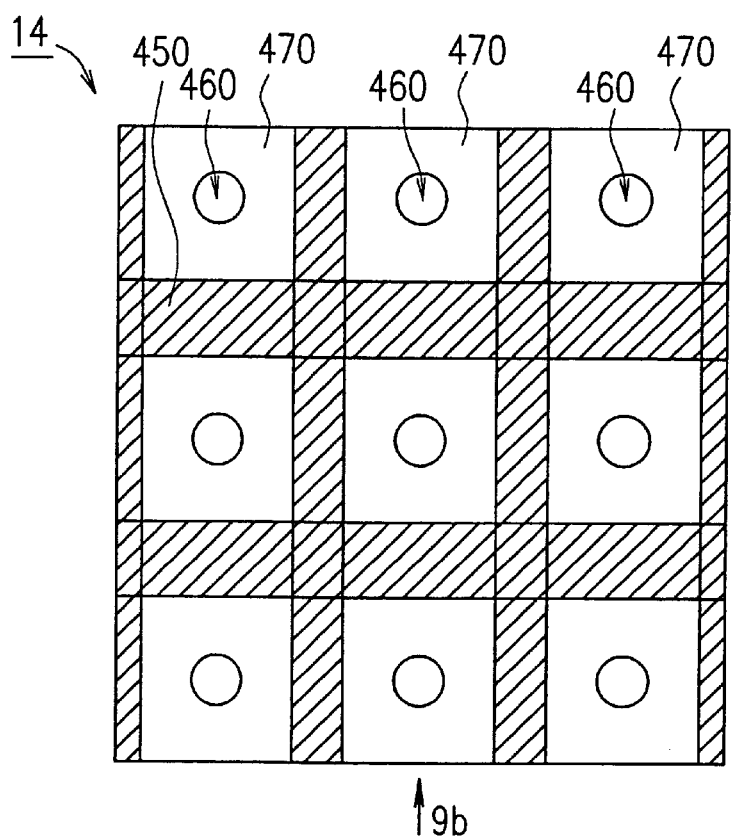
FIG. 9A is a plan view of a CF substrate of a PALCD device of Embodiment 4 according to the present invention.
Figure 9C:
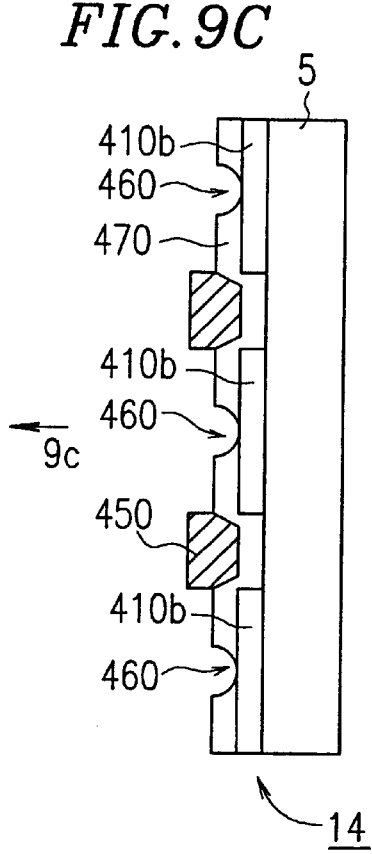
FIGS. 9B and 9C are sectional views of the CF substrate of FIG. 9A.
Figure 9B:
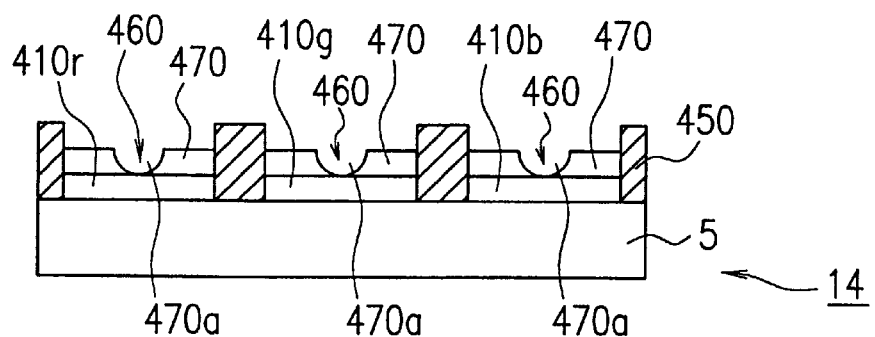

A PALCD device 1 of Embodiment 4 according to the present invention will be described with reference to FIGS. 9A to 9C. FIG. 9A is a schematic plan view of a color filter layer (CF) substrate 14 of the PALCD device 1 of Embodiment 4. FIGS. 9B and 9C are sectional views of the CF substrate 14 of FIG. 9A, observed in directions indicated by arrows 9b and 9a, respectively.

The PALCD device 1 of Embodiment 4 is different from the PALCD device 1 of Embodiment 1 in that the CF substrate 14 replaces the CF substrate 11 of Embodiment 1. Like components to those in Embodiment 1 are denoted by like reference numerals. According to this embodiment, a concave portion can be formed in each pixel region without forming a concave portion on a colored layer or an overcoat layer of the CF substrate.

Referring to FIGS. 9A to 9C, colored layers 410r, 410g, 410b are formed on the substrate 5, and light transparent conductive films 470 are formed on the respective colored layers. Each of the light transparent conductive films 470 has an opening 470a at a position corresponding to the center of each pixel region. In this embodiment, the opening 470a itself functions as a concave portion 460.

The openings 470a are formed by irradiating the light transparent conductive film using a photomask 488 (see FIG. 10B) having light shading portions corresponding to the centers of the pixel regions 400 to weaken the intensity of light incident on the centers or shade the centers from light and by developing the resultant light transparent conductive film 470.

Hereinbelow, a method for fabricating the CF substrate 14 of the PALCD device 1 of Embodiment 4 will be described with reference to FIGS. 10A to 10D.

Figure 10A:
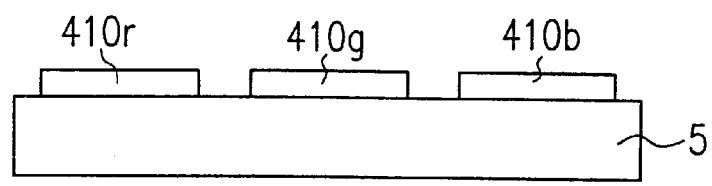
FIGS. 10A through 10D are sectional views illustrating a method for fabricating the CF substrate of the PALCD device of Embodiment 4.

Referring to FIG. 10A, the colored layers 410r, 410g, and 410b corresponding to red (R), green (G), and blue (B) colors are adhered to the light transparent substrate 5 made of glass having a thickness of about 0.7 mm, for example. The adhesion of the colored layers 410r, 410g, and 410b can be performed in a manner similar to that described in Embodiments 1 to 3.

Figure 10B:
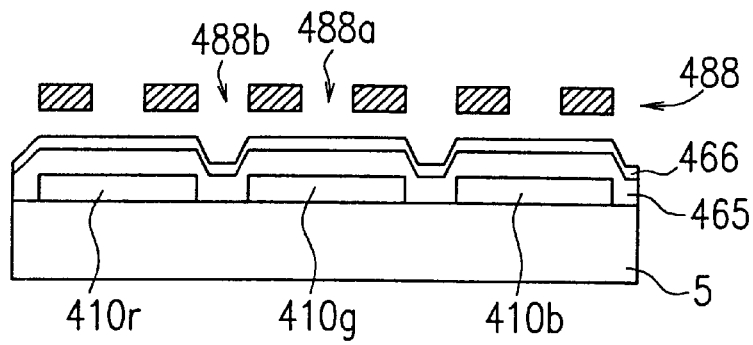

Referring to FIG. 10B, a light transparent conductive film 465 is formed on the resultant substrate 5. covering the colored layers 410r, 410g, and 410b by sputtering. A positive resist 466 is then applied to the light transparent conductive film 465. The resist 466 is then exposed to light using the photomask 488 having openings 488a at positions corresponding to the centers of the pixel regions 400r, 400g, and 400b and openings 488b at positions corresponding to gaps (black stripes) between the pixel regions. The size of the openings 488a is designed so that the size of areas on the resist 466 exposed to light via the openings 488a is about 10 μm or less in diameter.

Figure 10C:
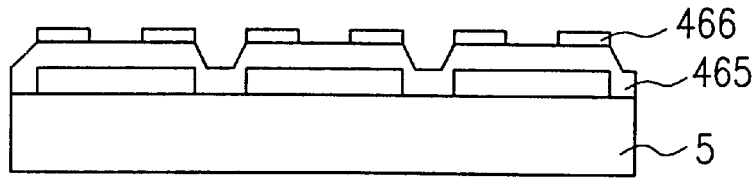

Referring to FIG. 10C, the light transparent conductive film 465 is etched using the developed resist 466. The thickness of the light transparent conductive film 465 is preferably about 100 nm or more. In general, if the thickness of the light transparent conductive film 465 exceeds about 100 nm, the etching speeds of the light transparent conductive film 465 in the plane direction and in the thickness direction become different from each other. Accordingly, if the thickness exceeds about 100 nm, a through hole is likely to be formed in the thickness direction. Since such a through hole is as small as only about ¹⁄₁₀₀ of the area of each pixel region even if formed, this does not affect the resultant display quality. For example, a through hole having a top area greater than a bottom area (the side of the light transparent substrate 5) and having a section of an inverted trapezoid or an inverted triangle may be formed.

Figure 10D:
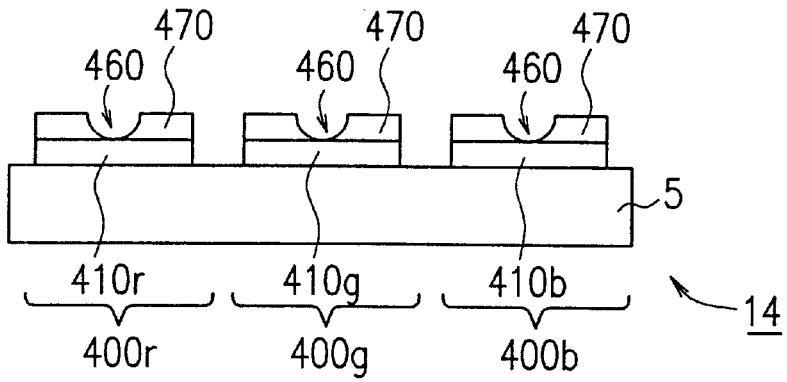

Referring to FIG. 10D, the light transparent conductive films 470 are formed by the etching, which have the concave portions 460 at positions corresponding to the centers of the pixel regions 400 (400r, 400g, and 400b). Thereafter, a resist wall is formed at positions corresponding to the gaps between the pixel regions 400 in a manner similar to that described in Embodiments 1 to 3, thereby to complete the CF substrate 14.

When concave portions are to be formed on electrodes, the thickness of the electrodes is preferably about 100 nm or more as described above. For example, in a large-scale display device where a plane resistance of the electrodes raises a problem, the electrodes are thickened to suppress the plane resistance. It is therefore especially effective to form concave portions on display electrodes for a large-scale display.

(Separation of Pixel)

In this embodiment, pixel regions corresponding to the same color may be separated from others by a wall.

(Formation of Alignment Film)

Since a liquid crystal material having a negative dielectric anisotropy (an n-type liquid crystal material) is injected in the panel, vertical alignment films which allow liquid crystal molecules to rise must be formed on the surfaces of the two substrates facing the liquid crystal material. As a material for such alignment films, JALS-204 (manufactured by Japan Synthetic Rubber Co., Ltd.), for example, may be used.

(Liquid Crystal Material)

A liquid crystal material having $\Delta\epsilon<0$ is preferably used. Also, the value of d·Δn is preferably 500 nm or less from the standpoint of the viewing angle characteristics and preferably 300 nm or more from the standpoint of the brightness, wherein d denotes the distance between the pair of substrates and Δn denotes the retardation of the liquid crystal layer.

(Precursor Mixture)

Compound 1 having the following formula:

Formula 1

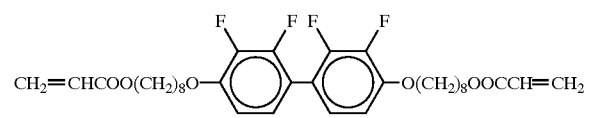

and a polymerization initiator as photocurable resins are mixed with an n-type liquid crystal material, to obtain a precursor mixture. As a polymerization initiator, Irgacure 651 (manufactured by Ciba Geigy Co., Ltd.) may be used. The precursor mixture is subjected to phase separation polymerization by being irradiated with light, to form a polymer region and liquid crystal domains. The photocurable resins form the polymer region surrounding the liquid crystal domains to fix the orientation of liquid crystal molecules.

(Control of Axial Symmetrical Orientation)

A circuit for plasma discharge and a circuit for driving the liquid crystal layer are connected to the PALCD device 1. While plasma is being discharged, a voltage is applied so that liquid crystal molecules move slightly. The orientation of the liquid crystal molecules can be fixed by irradiating the PALCD device 1 with UV light from the side of the PS substrate 30 (see FIGS. 1B and 1C).

(Phase Plate)

A phase plate may be disposed between the polarizing plates 50p and 50a (see FIGS. 1B and 1C) to improve the viewing angle characteristics in an azimuthal direction of 45° with respect to a polarizing axis.

EXAMPLE

Hereinbelow, a PALCD device 1 according to the present invention will be described more specifically with reference to FIGS. 1A to 1C.

A plasma switch (PS) substrate 30 includes: a light transparent substrate 31 which is made of glass having a thickness of about 2 mm and has one exhaust port formed therethrough; and anode electrodes 32a and cathode electrodes 32d formed on the glass substrate 31 in a row direction. The anode electrodes 32a and the cathode electrodes 32d were formed by applying Ni paste on the glass substrate 31 by screen printing and sintering the resultant substrate. Glass paste was then applied to the top surfaces of the anode electrodes 32a by screen printing several times and sintered, to obtain partitions 33 having a height of about 200 μm. The height of the partitions 33 was made uniform by grinding the partitions 33. Then, a thin glass plate (a dielectric layer) 35 having a thickness of about 50 μm, together with glass frit applied linearly along the periphery thereof, was bonded to the top surfaces of the partitions 33. The resultant structure was sintered, and then air was evacuated from the exhaust port to obtain an inner pressure of about $10^{-6}$ Torr. A rare gas was then injected until a pressure of several tens of Torr is obtained. Stripe-shaped signal electrodes 91 (see FIGS. 15B and 15C) were formed of ITO on columns of pixel regions 100 for the respective RGB colors. The direction in which the stripe-shaped signal electrodes 91 extend is perpendicular to the direction in which channels 34 of the PS substrate 30 extend.

A non-display portion of the CF substrate 11 was drilled at two positions to form bores for injecting a liquid crystal material. Spacers (not shown) were dispersed between the opposing two substrates 11 and 30 for maintaining the cell thickness. The CF substrate 11 and the PS substrate 30 were then bonded together so that a black mask 130 (black stripes) of the CF substrate 11 and the partitions 33 of the PS substrate 30 are aligned with each other and that the ITO signal electrodes of the CF substrate 11 and the partitions 33 of the PS substrate 30 extend so as to be perpendicular to each other. Air existing in a space between the CF substrate 11 and the PS substrate 30 was exhausted from the two bores for injecting a liquid crystal material provided in the CF substrate 11. A precursor mixture of a liquid crystal material and a resin material was then injected in the space between the CF substrate 11 and the PS substrate 30. The two bores were then sealed with a sealant.

(Forming Concave Portion in CF Substrate by Arranging Light Shading Mask in the Center of Pixel)

As can be seen in FIGS. 2A to 2J, a dry film resist 105$r$, e.g., Transer R (manufactured by Fuji Photo Film Co., Ltd.) was adhered, under pressure, to a glass substrate (light transparent substrate) 5, e.g., OA2 (manufactured by Nippon Electric Glass Co., Ltd.) having a thickness of about 0.7 mm, while heating the glass substrate 5 to about 100 to 140° C. A base layer (not shown) of the dry film resist 105$r$ was then peeled off. The dry film resist 105$r$ was irradiated with UV light using a light reducing mask 181 having light shading portions 181$s$ at positions corresponding to the peripheries of the pixel regions 100 which are to be red pixels, and light reducing portions 181$d$ at positions corresponding to the centers of the pixel regions 100 (see FIG. 2A). The size of the areas of the dry film resist to be light-shaded is preferably in the range of about 10 to 20 $\mu$m in diameter. If the size exceeds 20 $\mu$m in diameter, the area of the dry film resist corresponding to the center of each pixel region is completely removed in a subsequent developing process and decolored, thereby reducing the color purity as a color filter layer. If the size is smaller than about 10 $\mu$m in diameter, the portion corresponding to the center of each pixel region is not cured at all due to the limit resolution of the dry film resist, Transer R, thereby failing to form a concave portion.

The mask patterns shown in FIGS. 3A to 3E for the centers of the pixel regions may be used to improve the formation of the concave portion on the dry film resist. In these mask patterns, light shading regions having a size of 1 to 5 $\mu$m and transmissive regions are regularly or irregularly arranged. Using any of such mask patterns, a comparatively uniform UV irradiation pattern can be obtained at any position of the mask. Accordingly, uniform concave portions can be formed in the centers of the pixels over the entire glass substrate. The resultant substrate was developed with a developer, CD (manufactured by Fuji Photo Film Co., Ltd.), to remove an auxiliary layer of the entire substrate, and developed with a developer, PD (manufactured by Fuji Photo Film Co., Ltd.), to remove non-irradiated portions of the substrate. Then, light-shaded portions at the centers of the pixels were partially removed in the thickness direction to form concave portions 160. The non-irradiated portions were further removed completely with a rinse, SD (manufactured by Fuji Photo Film Co., Ltd.). The resultant substrate was irradiated with UV light again to heat the substrate for a fixed time period. Dry film resists 105$g$ and 105$b$, e.g., Transer G and Transer B, respectively, were then adhered to the resultant substrate and subjected to the steps of exposure to light and development as described above. Thus, the pixel regions 100 having concave portions in the centers thereof, corresponding to red (R), green (G), and blue (B) colors were formed. The order of the adhesion of R, G, and B dry film resists is not restricted.

(Formation of Black Mask)

Transer KR (manufactured by Fuji Photo Film Co., Ltd.) as a black dry film resist 125 (see FIG. 2G) was adhered, under pressure, to the resultant surface of the light transparent substrate 5 covering the colored layers 110$r$, 110$g$, and 110$b$, while heating the light transparent substrate 5 to about 100 to 140° C. A base layer (not shown) of the black dry film resist 125 was then peeled off. Thereafter, the substrate 5 was irradiated with UV light from the side thereof opposite to the side where the black dry film resist 125 was formed. Since the Transer R, G, and B (the colored layers 110$r$, 110$g$, and 110$b$) contain an UV absorbent, the pixel regions 100$r$, 100$g$, and 100$b$ do not transmit the UV light. Only the portions of Transer KR (the black dry film resist 125) located in the gaps between the pixel regions 100$r$, 100$g$, and 100$b$ were irradiated with the UV light. Thereafter, the portion of the light transparent substrate 5 which was to be the periphery of the panel was irradiated with UV light from the side thereof where Transer KR was adhered via a photomask as shown in FIG. 11. The resultant substrate was then developed with a developer, CD (manufactured by Fuji Photo Film Co., Ltd.), to remove an auxiliary layer of the entire substrate, developed with a developer, PD (manufactured by Fuji Photo Film Co., Ltd.), to remove the R, G, and B pixel portions, and further developed with a rinse, SD (manufactured by Fuji Photo Film Co., Ltd.), to completely remove non-irradiated portions. The resultant substrate was irradiated with UV light again to heat the substrate for a fixed time period. Thus, the CF substrate having concave portions at positions corresponding to the centers of the respective pixels was fabricated.

(Formation of Concave Portion by Removing Center of First Transparent Layer)

As can be seen in FIGS. 7A to 7L, a colorless dry film resist 215, e.g., colorless Transer which does not contain a pigment (manufactured by Fuji Photo Film Co., Ltd.) was adhered, under pressure, to the glass substrate (light transparent substrate) 5, e.g., OA2 (manufactured by Nippon Electric Glass Co., Ltd.), having a thickness of about 0.7 mm, while heating the light transparent substrate 5. A base layer (not shown) of the colorless dry film resist 215 was then peeled off. The resultant substrate was irradiated with UV light using a photomask for light-shading the peripheries and the centers of the respective pixel regions. The size of each light-shaded area of the colorless dry film resist 215 is preferably about 50% or less of one side of each pixel region and the diameter of each light-shaded area of the colorless dry film resist 215 is about 20 $\mu$m or more. If the size of the light-shaded area of the colorless dry film resist 215, that is the area to be removed, is greater than 50% of one side of each pixel region, the force of controlling the axial center of axial symmetrical orientation is lost. If the size is smaller than 20 $\mu$m in diameter, the portions of the colorless dry film resist corresponding to the centers of the pixel regions are removed in some cases and are not removed in the other cases due to the limit resolution of Transer (the colorless dry film resist) in a subsequent developing process, thereby failing to form uniform steps in the first layer. The resultant substrate was then developed with a developer, CD (manufactured by Fuji Photo Film Co., Ltd.), to remove an auxiliary layer of the entire substrate, developed with a developer, PD (manufactured by Fuji Photo Film Co., Ltd.), to remove non-irradiated portions of the substrate, and further developed with a rinse, SD (manufactured by Fuji Photo Film Co., Ltd.), to completely remove the non-irradiated portions. As a result, the substrate as shown in FIGS. 6A to 6C where the centers of the pixels were regularly removed was obtained. The resultant substrate was irradiated with UV light again to heat the substrate for a fixed time period.

Thereafter, Transer R (manufactured by Fuji Photo Film Co., Ltd.) was adhered, under pressure, to the substrate. A base layer (not shown) of Transer R was then peeled off. The portions of the resultant substrate which were to be red pixels were irradiated with UV light via a mask. The resultant substrate was then developed with a developer, CD (manufactured by Fuji Photo Film Co., Ltd.), to remove an auxiliary layer of the entire substrate, developed with a developer, PD (manufactured by Fuji Photo Film Co., Ltd.), to remove non-irradiated portions of the substrate, and further developed with a rinse, SD (manufactured by Fuji Photo Film Co., Ltd.), to completely remove the non-irradiated portions. The substrate was irradiated with UV light again to heat the substrate for a fixed time period. As a result, R pixels each having a concave portion in the center were formed on the transparent layer. Likewise, Transer G and Transer B were adhered and subjected to the steps of exposure to light and development as described above to form G and B pixels each having a concave portion in the center. The order of the adhesion of Transer R, G, and B is not restricted.

(Formation of Black Mask)

Transer KR (manufactured by Fuji Photo Film Co., Ltd.) as a black dry film resist was adhered, under pressure, to the surface of the resultant substrate covering the R, G, and B pixels, while heating the substrate. A base layer (not shown) of Transer KR was then peeled off. Thereafter, the substrate was irradiated with UV light from the side thereof opposite to the side where Transer KR was formed. Since Transer R, G, and B contain an UV absorbent, the R, G, and B pixel portions do not transmit the UV light. Only the portions of Transer KR located in the gaps between the R, G, and B pixel regions were irradiated with the UV light. Thereafter, the portion of the substrate which was to be the periphery of the panel was irradiated with UV light from the side thereof where Transer KR was adhered via a photomask as shown in FIG. 11. The resultant substrate was then developed with a developer, CD (manufactured by Fuji Photo Film Co., Ltd.), to remove an auxiliary layer of the entire substrate, developed with a developer, PD (manufactured by Fuji Photo Film Co., Ltd.), to remove the R, G, and B pixel regions, and further developed with a rinse, SD (manufactured by Fuji Photo Film Co., Ltd.), to completely remove non-irradiated portions. The resultant substrate was irradiated with UV light again to heat the substrate for a fixed time period. Thus, the CF substrate having concave portions at positions corresponding to the centers of the respective pixels was fabricated.

ITO was deposited on the resultant CF substrate to a thickness of about 100 nm by sputtering to form stripe-shaped light transparent conductive films extending along respective columns of pixels of the same colors.

(Formation of Wall)

A wall having a height of about 3 μm was formed using OMR83 (manufactured by Tokyo Ohka Kogyo Co., Ltd.) on the black mask.

(Formation of Alignment Film)

Vertical alignment films were formed using JALS-204 (manufactured by Japan Synthetic Rubber Co., Ltd.) on the outer surfaces of the CF substrate and the PS substrate.

(Fabrication of PS Substrate)

The PS substrate was fabricated in the following manner. Ni paste was applied by screen printing to a glass substrate which has a thickness of about 2 mm and includes one exhaust port, and the resultant substrate was sintered. Anode electrodes and cathode electrodes were formed on the glass substrate in a row direction. Glass paste was applied to the top surfaces of the anode electrodes by screen printing several times and sintered, to obtain partitions having a height of about 200 μm. The height of the partitions was made uniform by grinding the partitions. Then, a thin glass plate having a thickness of about 50 μm, together with glass frit applied linearly along the periphery thereof, was bonded to the top surfaces of the partitions. The resultant structure was sintered, and then air was evacuated through the exhaust port to obtain an inner pressure of about $10^{-6}$ Torr. A rare gas was then injected until a pressure of several tens of Torr was obtained. Vertical alignment films 112 (see FIG. 1B) were applied to the surface of the thin glass plate and sintered.

In the CF substrate, stripe-shaped signal electrodes for signal writing were formed of ITO so as to correspond to respective columns of the R, G, and B pixels. A non-display portion of the CF substrate was drilled at two positions to form bores for injecting a liquid crystal material. Micropearl 6.0 μm dia. (manufactured by Sekisui Chemical Co., Ltd.) was dispersed on the surface of the CF substrate for maintaining the cell thickness. The CF substrate and the PS substrate were then bonded together so that the direction of the signal electrodes and the ribs (partitions) of the PS substrate extend so as to be perpendicular to each other. Air existing in a space between the CF substrate and the PS substrate was exhausted from the two bores for injecting a liquid crystal material provided in the CF substrate. A precursor mixture was then injected in the space, and the two bores were sealed with a sealant.

(Precursor Mixture)

As photocurable resins, 0.3 wt % of Compound 1 having the following formula:

Formula 1

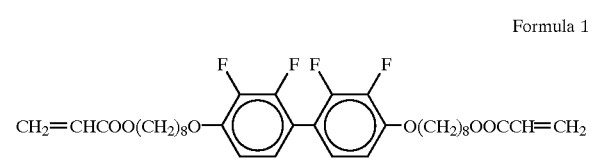

and 0.1 wt % of a polymerization initiator, Irgacure 651, were mixed with an n-type liquid crystal material (Δε=−4.0, Δn=0.08). As a liquid crystal material, S811 (manufactured by Merck & Co., Inc.) was used and mixed so that liquid crystal molecules are twisted by 90°.

(Control of Axial Symmetrical Orientation)

A circuit for plasma discharge and a circuit for driving the liquid crystal layer were connected to the resultant cell. While plasma was being discharged, a voltage of about 10 V was applied to the precursor mixture. While maintaining this state, the cell was irradiated with UV light (intensity:

365 nm, 6 mW/cm²) from the side of the PS substrate for 10 minutes, to fix the orientation of the liquid crystal molecules.
(Observation)

Figure 13:
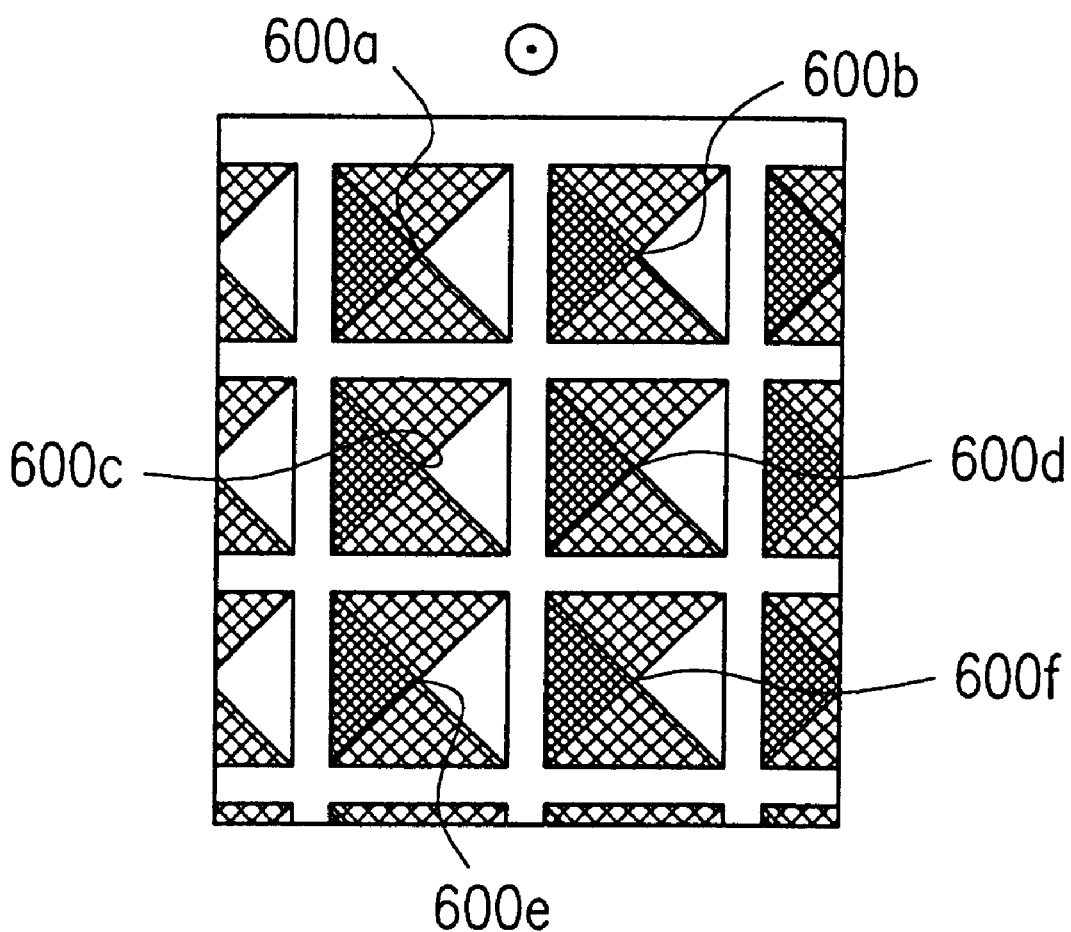
FIG. 13 is a schematic view illustrating the results of the observation of pixel regions of a PALCD device having a CF substrate according to the present invention, using a polarizing microscope.

The pixels of the thus-fabricated panel, with the polarizing axes being in the crossed Nicols state, were observed using a polarizing microscope under the state of discharging plasma and applying a voltage to the liquid crystal layer. The results are shown in FIG. 13. Each of the R, G, and B pixels had a cross extinction pattern. When the panel was rotated, the cross extinction patterns of the respective pixels were rotated with the centers of the crosses (e.g., 600a to 600f) being kept unchanged. This indicates that liquid crystal molecules in each pixel domain are oriented in an axial symmetrical manner around the center of the cross. Moreover, the center of each cross was located inside the concave portion formed in each pixel. This was observed over the entire panel, and thus it was confirmed that the symmetrical axes of the pixels can be controlled by the concave portions formed in the CF substrate for the respective pixels. Furthermore, since the thickness of the colored layers of the pixels is kept unchanged in the concave portions, the Y value is invariable in the respective pixels. Accordingly, the resultant panel had a good color quality.

Polarizing plates were attached to the opposite surfaces of the panel so that the polarizing axes were perpendicular to each other. The resultant LCD device was observed in upper, lower, left, and right directions.

Comparative Example

A CF substrate and then an LCD device were fabricated in the same manner as that described above except that no concave portion was formed in the CF substrate.

Experiment

Figure 14:
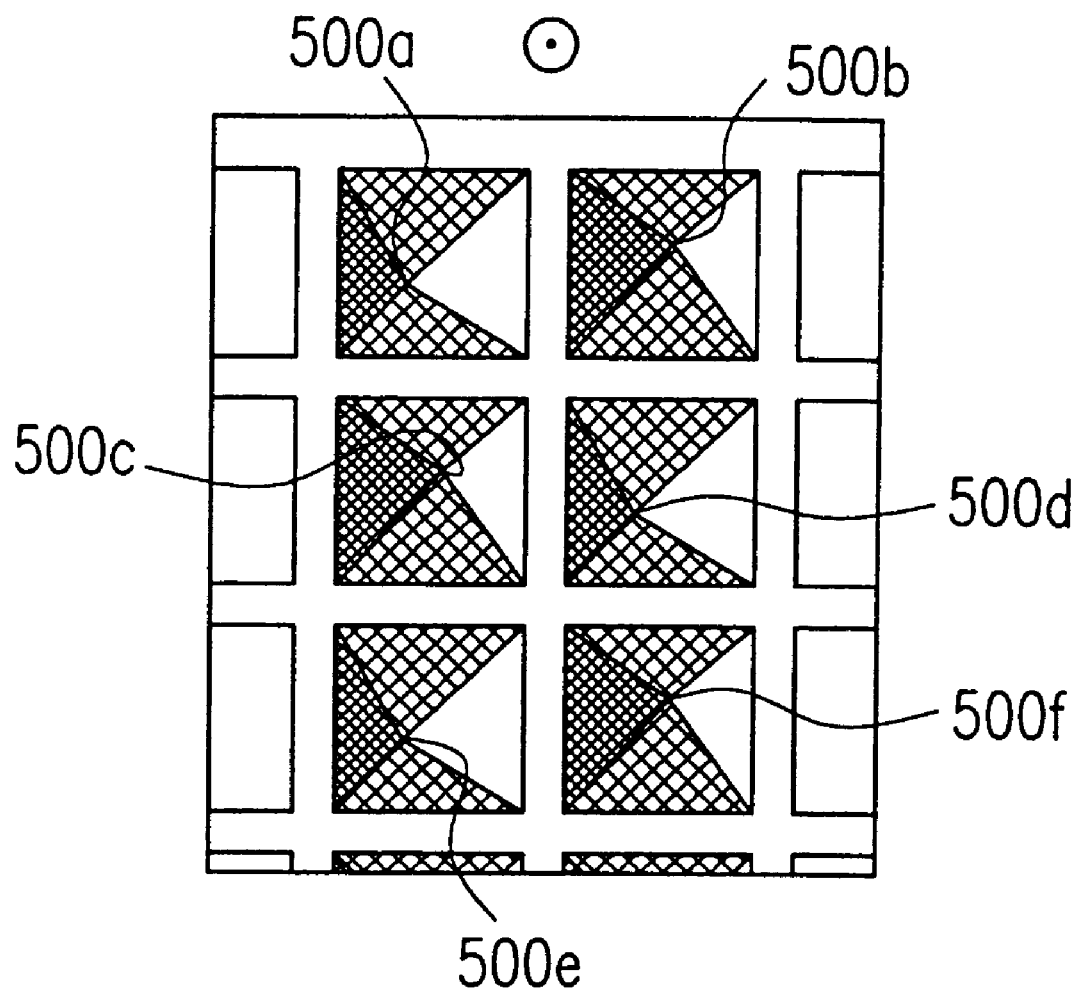
FIG. 14 is a schematic view illustrating the results of the observation of pixel regions of a PALCD device having a conventional CF substrate, using a polarizing microscope.

The PALCD devices fabricated in the above example and comparative example were observed. In the comparative example, as shown in FIG. 14, the pixels have different axial positions 500a to 500f. When an observer viewed the LCD device while tilting the LCD device, an area of each pixel where the contrast changed and an area thereof where the contrast did not change differed among pixels. As a result, the variation in the axial position of the orientation of liquid crystal molecules was observed as a difference in the brightness of the pixels. This was perceived by the observer as a "rough" display.

Table 1 below shows the results of the comparison of the example and the comparative example. In the comparative example, the probability of a production of a pixel in which the axis is displaced from the center is as high as 31.4%, lowering the display quality. On the contrary, in the LCD device of the example according to the present invention, the axis was positioned in the center of the pixel for all pixels, obtaining good display free from "roughness" even if the viewing angle was tilted.

TABLE 1

|  | Example | Comparative example |
|---|---|---|
| Microscopic appearance of pixels | Centers of extinction patterns are aligned among pixels. | Centers of extinction patterns vary among pixels. |
| Probability of production of axially displaced pixel | 0% | 31.4% |
| Display quality (when tilted) | Free from roughness | rough |

Thus, according to the present invention, high-precision axial position control is possible by only adding a simple step to the current process for fabricating a color filter layer substrate. Accordingly, a liquid crystal display device having wide viewing angle characteristics free from "roughness" of display can be provided only by a small increase in cost.

Moreover, the film thickness of the color filter layer can be precisely controlled by using a dry film having a concave portion for controlling the axial position. Accordingly, a high-quality color liquid crystal display device free from decoloration can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of fabricating a liquid crystal display, the method comprising the steps of:

providing first and second substrates, providing a mask including both a light shading portion and a light reducing portion;

forming a dry film on the first substrate;

positioning the mask over the dry film and utilizing the light reducing portion of the mask in order to form a concave portion in the dry film without creating an aperture in the dry film at the concave portion;

providing a liquid crystal material between the first and second substrates wherein liquid crystal molecules are oriented in an axial symmetrical manner; and providing a liquid crystal domain in a manner such that a symmetric axis of the liquid crystal domain extends through the concave portion and is substantially perpendicular to the first substrate.

\* \* \* \* \*